US007473729B2

(12) United States Patent
Feeney et al.

(10) Patent No.: US 7,473,729 B2
(45) Date of Patent: *Jan. 6, 2009

(54) BARRIER COATING MIXTURES CONTAINING NON-ELASTOMERIC ACRYLIC POLYMER WITH SILICATE FILLER AND COATED ARTICLES

(75) Inventors: Carrie A. Feeney, Bridgewater, NJ (US); Harris A. Goldberg, Edison, NJ (US); Michele Farrell, Bethlehem, PA (US); Douglas P. Karim, Green Brook, NJ (US)

(73) Assignee: InMat Inc., Somerville, NJ (US)

( * ) Notice: Subject to any disclaimer, the term of this patent is extended or adjusted under 35 U.S.C. 154(b) by 636 days.

This patent is subject to a terminal disclaimer.

(21) Appl. No.: 11/113,349

(22) Filed: Apr. 22, 2005

(65) Prior Publication Data

US 2005/0228104 A1    Oct. 13, 2005

Related U.S. Application Data

(63) Continuation-in-part of application No. 10/741,741, filed on Dec. 19, 2003.

(60) Provisional application No. 60/498,799, filed on Aug. 29, 2003.

(51) Int. Cl.
  *C08K 3/34* (2006.01)
(52) U.S. Cl. .................. 524/445; 524/447; 524/560; 524/561; 524/562; 501/145; 501/147
(58) Field of Classification Search ............ 524/445, 524/447; 501/145, 147
See application file for complete search history.

(56) References Cited

U.S. PATENT DOCUMENTS

| 4,344,859 | A |   | 8/1982  | Burke, Jr. .................. 252/359 D |
| 4,425,465 | A |   | 1/1984  | Padget et al. ................. 524/450 |
| 4,472,538 | A |   | 9/1984  | Kamigaito et al. ........... 523/202 |
| 4,491,618 | A |   | 1/1985  | Kuwajima et al. ........... 428/241 |
| 4,505,755 | A |   | 3/1985  | Shinozuka et al. ....... 106/308 B |
| 4,515,633 | A | * | 5/1985  | Cruz, Jr. .................... 106/18.26 |
| 4,528,235 | A |   | 7/1985  | Sacks et al. .................. 428/220 |
| 4,536,425 | A |   | 8/1985  | Hekal ........................ 428/35 |
| 4,857,397 | A |   | 8/1989  | Mowdood et al. ........... 428/323 |
| 4,889,885 | A |   | 12/1989 | Usuki et al. .................. 524/445 |
| 4,911,218 | A |   | 3/1990  | Patitsas ....................... 152/525 |
| 4,960,639 | A |   | 10/1990 | Oda et al. .................... 428/34.5 |
| 4,983,432 | A |   | 1/1991  | Bissot ........................ 428/35.7 |
| 5,049,609 | A |   | 9/1991  | Patitsas ....................... 524/386 |
| 5,091,467 | A |   | 2/1992  | Beers .......................... 525/57 |
| 5,178,702 | A |   | 1/1993  | Frerkin, Jr. et al. .......... 152/510 |
| 5,576,372 | A |   | 11/1996 | Kresge et al. ................ 524/442 |
| 5,595,750 | A |   | 1/1997  | Jacobson et al. ............. 424/421 |
| 5,665,183 | A |   | 9/1997  | Kresge et al. ................ 524/445 |
| 5,665,810 | A |   | 9/1997  | Patchett et al. .............. 524/449 |
| 5,747,560 | A | * | 5/1998  | Christiani et al. ............ 523/209 |
| 5,854,326 | A |   | 12/1998 | Sakaya et al. ................ 524/445 |
| 5,883,173 | A |   | 3/1999  | Elspass et al. ............... 524/446 |
| 5,942,298 | A |   | 8/1999  | Sakaya et al. ............... 428/36.6 |
| 6,087,016 | A |   | 7/2000  | Feeney et al. ................ 428/454 |
| 6,107,387 | A |   | 8/2000  | Kaylo et al. ................. 524/446 |
| 6,162,857 | A |   | 12/2000 | Trexler, Jr. et al. .......... 524/445 |
| 6,232,389 | B1|   | 5/2001  | Feeney et al. ................ 524/450 |
| 6,759,463 | B2|   | 7/2004  | Lorah et al. ................. 524/445 |
| 6,838,507 | B2|   | 1/2005  | Chou et al. .................. 524/445 |
| 2002/0032272 | A1 |   | 3/2002 | Sievers et al. ............... 524/501 |
| 2002/0058740 | A1 |   | 5/2002 | Lorah et al. ................. 524/445 |
| 2005/0059769 | A1| * | 3/2005 | Chou et al. .................. 524/445 |

FOREIGN PATENT DOCUMENTS

| CA | 993738        | 7/1976  | ........... 117/237 |
| EP | 0 125 815 A2  | 11/1984 |                    |
| EP | 0 569 6465 A1 | 11/1993 |                    |
| EP | 0 601 877 A1  | 6/1994  |                    |
| EP | 0 747 323 A1  | 12/1996 |                    |
| GB | 2 134 094 A   | 8/1984  |                    |
| JP | 11246729      | 9/1999  |                    |
| WO | WO 93/04117   | 3/1993  |                    |

(Continued)

OTHER PUBLICATIONS

E.L. Cusler et al., J. Membrane Sci. 38:161-174 (1988); Chang, J. et al., Journal of Aplied Polymer Science, vol. 84, 2294 (2002); Yano, K. et al., Journal of Polymer Science A: Polymer Chemistry, 35, 2289 (1997); Lan, T. et al., Chem. Mater. 6, 573 (1994); Messersmith, P.B. and Giannelis, E.P., Journal of Polymer Science A: Polymer Chemistry 33,1047.

(Continued)

*Primary Examiner*—Bernard Lipman
(74) *Attorney, Agent, or Firm*—Michael W. Ferrell

(57) ABSTRACT

Barrier coating mixtures contain in a carrier liquid, (a) a non-elastomeric substantially polymerized acrylic polymer; (b) an exfoliated layered platelet-like silicate filler which has been acid treated and having an aspect ratio greater than 25; and (c) at least one additive, wherein the total solids content is less than 30% and the amount of filler is between 5% to about 60% of the total solids content. Coated articles and containers, freestanding films and packaging films are produced using the barrier coating mixtures. Methods of manufacturing such coated products and coating mixtures are also encompassed.

44 Claims, No Drawings

FOREIGN PATENT DOCUMENTS

| WO | WO 93/04118 | 3/1993 |
| WO | WO 97/00910 | 1/1997 |
| WO | WO 98/56861 | 12/1998 |
| WO | WO 98/56861 A1 * | 12/1998 |
| WO | WO 00/49072 | 8/2000 |
| WO | WO 2004/022635 A1 | 3/2004 |
| WO | WO 2004/065474 A1 | 8/2004 |
| WO | WO 2005/003029 A2 | 1/2005 |

OTHER PUBLICATIONS

L.E. Nielsen, Journal of Macromolecular Science, Chemistry AI, 929, (1967); R.K. Bharadwaj, "Modeling the Barrier Properties of Polymer-Layered Silicate Nanocomposites", Macromolecules 34, 9189 (2001); G.H. Fredrickson and J. Bicerano, "Barrier properties of oriented disk composites", Journal of Chemical Physics 110, 2181 (1999).

W.J. Ward et al., "Gas Barrier Improvement Using Vermiculite and Mica in Polymer Films", Journal of Membrane Science, 55:173-180 (1991); Lee, D.C. and Jang, L.W., Journal of Applied Polymer Science, vol. 61, 1117-1122 (1996); Wu, Y-P et al., "Structure of Carboxylated Acrylonitrile-Butadiene Rubber (CNBR)-Filler Nanocomosites by Co-coagulating Rubber Latex and Filler Aqueous Suspension", Journal of Applied Polymer Science, 82, 2842-2848 (2001).

Wu, Y-P et al., "Structure and Properties of Nitrile Rubber (NBR)-Filler Nanocomosites by Co-coagulating NBR Latex and Filler Aqueous Suspension", Journal of Applied Polymer Science, 89, 3855-3858 (2003); Varghese and Karger-Kocsis, "Natural rubber-based nanocomposites by latex compounding with layered silicates", Polymer, 1-8 (2003).

Goldberg et al., "Nanocomposite Barrier Coatings for Elastomeric Applications", Materials Research Society, Symposium T: Polymer nanocomposites, paper T4.7, (Apr. 2002); Goldberg et al., "Elastomeric Barrier Coatings for Sporting Goods", ACS Rubber Section, Apr. 29, 2002, paper 17, published in Rubber World, vol. 226, No. 5, p. 15 (Aug. 2002).

Oriakhi and Lerner "Poly(Pyrrole) and Poly(Thiophene)/Filler Nanocomposites via Latex-Colloid Interaction", Materials Research Bulletin, 30, 723-729 (1995); van Amerongen, G.J., "Diffusion in Elastomers", Rubber Chem Tech, 37, p. 1065-1152 (1964); The Vanderbilt Latex Handbook, 3rd edition, R.T. Vanderbilt Company, Inc., pp. 112-115.

Patent Abstracts of Japan, vol. 1999, No. 14, Dec. 22, 1999 & JP 11 246729 A (Sumitomo Chem Co Ltd), Sep. 14, 1999; and Patent Abstracts of Japan, vol. 012, No. 467 (C-550), Dec. 7, 1988 & JP 63 189446 A (Canyo Electric Co Ltd), Aug. 5, 1988.

Interlamellar Esterification of H-Matgadiite With Aliphatic Alcohols; Yoshimichi Mitamura et al.; Chemistry of Materials, vol. 13, No. 10, 2001, pp. 3747-3753.

Patent Abstracts of Japan, vol. 1999, No. 14, Dec. 22, 1999 & JP 11 246729 A (Sumitomo Chem Co Ltd), Sep. 14, 1999.

Patent Abstracts of Japan, vol. 012, No. 467 (C-550), Dec. 7, 1988 & JP 63 189446 A (Canyo Electric Co Ltd), Aug. 5, 1988.

* cited by examiner

BARRIER COATING MIXTURES CONTAINING NON-ELASTOMERIC ACRYLIC POLYMER WITH SILICATE FILLER AND COATED ARTICLES

CLAIM FOR PRIORITY

This application is a continuation-in-part of U.S. patent application Ser. No. 10/741,741 which was filed on Dec. 19, 2003 which claims the benefit of priority of U.S. Provisional Patent Application No. 60/498,799 filed Aug. 29, 2003.

FIELD OF INVENTION

The present invention relates to novel acrylic barrier coating compositions, and particularly to coatings which have an enhanced reduction in gas permeability.

BACKGROUND OF INVENTION

Barrier coatings (layers) which prevent, reduce, or inhibit the permeation of a selected substrate with a gas, vapor, chemical and/or aroma have been widely described, and such coatings are used in a variety of industries, e.g., the packaging industries, automobile industries, paint industries, tire industries etc. Typical barrier materials used in coatings include polyesters, PVDC, polyurethanes, acrylic polymers, etc.

It is well known that the barrier properties of a polymer can be improved by the addition of impermeable plate like structures. When the plates are oriented perpendicular to the diffusion (permeation) direction, the diffusing molecules must go around the plates. This leads to significant reductions in the permeability of the polymer. See, for example, E. L. Cussler et al, *J. Membrane Sci.* 38:161-174 (1988); W. J. Ward et al, *J. Membrane Sci.*, 55:173-180 (1991); Chang, J. et al, *Journal of Applied Polymer Science*, Vol. 84, 2294 (2002); Yano, K. et al, *Journal of Polymer Science A: Polymer Chemistry*, 35, 2289 (1997); Lan, T. et al, *Chem. Mater.* 6, 573 (1994); Messersmith, P. B. and Giannelis, E. P, *Journal of polymer Science A: Polymer Chemistry* 33,1047 (1995); U.S. Pat. Nos. 4,528,235; 4,536,425; 4,911,218; 4,960,639; 4,983, 432; 5,091,467; and 5,049,609; and International Patent Application No. WO93/04118, published Mar. 4, 1993, among others.

Control of permeation using relatively low aspect ratio platelets, at low concentrations, and thermoplastically processed at high shear rates has been previously disclosed. See, for example, E. L. Cussler et al, *J. Membrane Sci.* 38:161-174 (1988); L. E. Nielsen, *Journal of Macromolecular Science, Chemistry* A1,929, (1967); R. K. Bharadwaj, "Modeling the Barrier Properties of Polymer-Layered Silicate Nanocomposites", *Macromolecules* 34, 9189 (2001); G. H. Fredrickson and J. Bicerano, "Barrier properties of oriented disk composites", *Journal of Chemical Physics* 110, 2181 (1999). These conditions lead to relatively small improvements in the barrier properties of the polymer. This is because the reduction in permeability varies rapidly with the aspect ratio and the concentration of plates when the plates are well aligned. If the plates are not well aligned, the reductions in permeability are further reduced. The targeted application of these earlier efforts was not coatings, but a bulk polymer with improved barrier and/or mechanical properties.

Use of platelet fillers in coating formulations is also well known. Most often, they have been used in paints to modify the rheology, enabling the production of no-drip paints. These platelet fillers are typically exfoliated silicates with aspect ratios of 50 or less. They form a house of cards type structure in the coating suspension that gives a gel like property to the paint (or coating) when it is not undergoing any shear. Generally, these structures do not have the optimally aligned plates to significantly reduce the permeability of the coating.

Exfoliated silicates have been used to produce nanocomposite coatings by several methods. The most widely used has been by combining a dissolved polymer with exfoliated filler. Water-soluble polymers such as polyvinyl alcohol (PVOH) have been combined with water exfoliated filler such as vermiculite. See, for example, Japan patent 11-246729, Sep. 14, 1999, "Gas-Barrier Poly(vinyl alcohol)/poly (acrylic acid) Compositions and their Laminates and Shaped Articles". Sumitomo Chemical Co., Ltd. Polycarbonate dissolved in toluene has been combined with organically functionalized filler and reportedly forms good barrier coatings. See, for example, W. J. Ward et al, "Gas Barrier Improvement Using Vermiculite and Mica in Polymer Films", *Journal of Membrane Science*, 55:173-180 (1991). Other polymers have also been made into barrier coatings by dissolving them in a solvent, and using an organically functionalized filler in an effort to improve the barrier properties. See, for example, Yano, K., et al, "Synthesis and properties of polyimide-filler hybrid composites", *Journal of Polymer Science A: Polymer Chemistry*, 35, 2289 (1997).

Processes for utilizing emulsion polymerization procedures for preparing aqueous polymer/clay nanocomposite dispersions are disclosed in U.S. Pat. No. 6,838,507; U.S. patent applications 2005/0059769 and 2002/0086908 (all to Rohm and Haas). The disclosed processes include both in-situ polymerizations in the presence of at least partially exfoliated unmodified clays as well as admixtures of polymer dispersions with at least partially exfoliated unmodified clay dispersions. The disclosed nanocomposite dispersions are useful for preparing a variety of materials, such as coatings, adhesives, caulks, sealants, plastics additives, and thermoplastic resins. Processes for preparing polymer clay nanocomposite powders and use of these powders as plastic resin and plastics additives are also disclosed.

The process in the '507 patent provides a first aqueous reaction mixture comprising at least one ethylenically unsaturated monomer and a second aqueous reaction mixture comprising an at least partially exfoliated aqueous clay dispersion having at least one unmodified clay and at least one ethylenically unsaturated monomer. The two reaction mixtures are combined and polymerized. One of the monomers is an acid containing monomer.

Additional processes for utilizing emulsion polymerization procedures for preparing aqueous nanocomposite dispersions are disclosed in U.S. Pat. No. 6,759,463 and U.S. patent application 2002/0058740 (both to Rohm and Haas). In these cases, the disclosed processes include both in-situ polymerizations in the presence of at least partially exfoliated, lightly modified clays as well as admixtures of polymer dispersions with at least partially exfoliated, lightly modified clay dispersions. The clays in this invention are hydrophobically modified through the use of an agent such as a surfactant, silane, or other modifier. The agents may include amino acid surfactants, alkylammonium ion surfactants, silanes, aminomethylstyrene, living free radical polymerization initiator ("LFRP"), a polymerizable surfactant or by an acid ion exchange process. The acid ion exchange process comprises adding an ion exchange resin to the clay.

Another method used to form nanocomposites by incorporating the exfoliated filler into the monomer before polymerization is found in U.S. Pat. No. 4,472,538 "Composite Material Composed of Filler Mineral and Organic High Polymer and Method for Producing the Same", Sep. 18, 1984; U.S.

Pat. No. 4,889,885 "Composite Material Containing a Layered Silicate", Dec. 26, 1989. Other techniques incorporating exfoliated clay into monomer droplets before the emulsion polymerization for elastomeric polymers are described in PCT Patent No. WO 97/00910, Jan. 9, 1997, "Polymer nanocomposite Formation by emulsion Synthesis", Exxon Research and Engineering Co. Methacrylate monomer was combined with exfoliated filler in aqueous dispersion prior to its polymerization into a nanocomposite. See, for example, Lee, D. C. and Jang, L. W., *Journal of Applied Polymer Science*, Vol. 61, 1117-1122 (1996). These methods were designed to help make bulk nanocomposites for thermal processing; none of the methods led to practical coating formulations.

There are several examples of using an aqueous dispersion of exfoliated filler with an aqueous dispersion of polymer to form a nanocomposite. Most of that work used elastomeric polymers in suspension. See, for example, Wu, Y-P et al, "Structure of Carboxylated Acrylonitrile-Butadiene Rubber (CNBR)-Filler Nanocomposites by Co-coagulating Rubber Latex and Filler Aqueous Suspension", *Journal of Applied Polymer Science*, 82, 2842-2848 (2001); Wu, Y-P et al, "Structure and Properties of Nitrile Rubber (NBR)-Filler Nanocomposites by Co-coagulating NBR Latex and Filler Aqueous Suspension", *Journal of Applied Polymer Science*, 89, 3855-3858 (2003); Varghese and Karger-Kocsis, "Natural rubber-based nanocomposites by latex compounding with layered silicates", *Polymer* (in press) (2003); Feeney et al, U.S. Pat. No. 6,087,016, "Barrier Coating of an Elastomer and a Dispersed Layered Filler in a Liquid Carrier", Jul. 11, 2000; Feeney et al, U.S. Pat. No. 6,232,389, "Barrier Coating of an Elastomer and a Dispersed Layered Filler in a Liquid Carrier and Coated Articles", May 15, 2001; Goldberg et al, "Nanocomposite Barrier Coatings for Elastomeric Applications", *Materials Research Society, Symposium T*: Polymer nanocomposites, paper $T^{4.7}$, (April 2002); and Goldberg et al, "Elastomeric Barrier Coatings for Sporting Goods", ACS Rubber Section, Apr. 29, 2002, paper 17, published in *Rubber World*, vol. 226, No. 5, p 15 (August 2002). These references do not employ ion exchange techniques to make the filler surface more compatible with the polymer because it typically causes the filler to fall out of aqueous suspension.

In order to form a nanocomposite from a combination of polymer spheres and filler platelets, one needs significant flow and deformation of the polymer. Thus it was not expected that this approach would work with more rigid, non-elastomeric polymers. The only example found that tried this approach in a non-elastomeric polymer is described in Oriakhi and Lerner ["Poly(Pyrrole) and Poly(Thiophene)/Filler Nanocomposites via Latex-Colloid Interaction", *Materials Research Bulletin*, 30, 723-729(1995)]. That method involved forming separate aqueous polymer latex and aqueous exfoliated clay suspensions. The latex was washed repeatedly before combining with the exfoliated clay in order to remove stabilizers and surfactants. Mixing the suspensions did not lead to stable coating suspensions, but rather coagulating mixtures where the nanocomposite came out of suspension. These mixtures of clay and polymer dispersed in water could not be used as a coating formulation and are therefore very different from the invention described in this patent.

The approach used by us and described in this patent differs from the above art in that it leads to stable coating formulations that can be applied to a range of articles in order to form an acrylic nanocomposite coating. The nanocomposite forms during the drying process which is well below the melt temperature of the polymer. Thus it is clear that the polymer particles undergo significant deformation during drying.

SUMMARY OF THE INVENTION

Advantageously, the present invention solves the problems of the prior art by providing an article of manufacture having an acrylic nanocomposite film which is adhered to a substrate layer. The nanocomposite layer comprises a non-elastomeric acrylic polymer, an acid-treated, layered silicate filler, and optionally, one or more additives of a surfactant, emulsifier, anti-foaming agent, dispersing agent, wetting agent, leveling agent, thickener, absorber or getter. The nanocomposite layer has an oxygen permeability that is at least 50 times less than that of a like film containing no layered silicate material. Preferably the nanocomposite has an oxygen permeability that is at least 100, 500, 1,000, 5,000, and even 10,000 times less than a like film containing no layered silicate filler material.

Typically, the nanocomposite film has an oxygen permeability of less than about 0.1 cc-mm/$m^2$-day-atm and preferably less than 0.01 or 0.001 cc-mm/$m^2$-day-atm at 23° C. and 0% relative humidity.

Generally, the acrylic polymer in the nanocomposite layer comprises between about 65% and 95% acrylic polymer. The acrylic polymer may be chosen from the group consisting of polymers of acrylates, methacrylates, acrylonitrile, acrylamides, methacrylamides, copolymers thereof and optionally containing vinyls, styrenes and olefins. Desirably, the acrylic polymer is self-crosslinking and contains hydroxyl groups. The concentration of hydroxyl groups in the acrylic polymer typically corresponds to a hydroxyl number of between 1 and 50. In preferred embodiments the hydroxyl number is between 10 to 40 or between 15 to 30.

Additionally, the nanocomposite film may contain between about 5 wt. % and 60 wt. percent silicate filler material. Other suitable amounts include between 35 and 40 wt. percent silicate filler. The platelets in the silicate usually have an aspect ratio of at least about 25, and suitably at least about 500. Even more preferably, the aspect ratio should be at least about 5000.

The silicate filler may exhibit oriented, macroscopic domains when dispersed in water at a concentration of 0.02% by weight. The silicate may be selected from the group consisting of bentonite, vermiculite, montmorillonite, nontronite, beidellite, volkonskoite, hectorite, saponite, laponite, sauconite, magadiite, kenyaite, ledikite and combinations thereof. Vermiculite is a particularly suitable silicate, and even more preferred is montmorillonite. Typically, the silicate filler has not been organically functionalized.

The nanocomposite film typically comprises between about 5 and 40 wt. % of acid. The acid is usually either acetic acid or glycine.

The nanocomposite film has suitable thickness ranges of between about 0.1 to 200 microns. Even more preferable are thicknesses between about 0.1 and 100 microns, 0.1 and 50 microns, and 0.1 and 10 microns.

The substrate layer in the present invention is typically a film or molded article that comprises plastics such as polyesters, polyamides, chlorinated polymers, polyolefins, polyurethanes, polyethers, polyketones, polycarbonates, vinylics (such as vinyl acetate and vinyl cloride), styrenes, fluoropolymers, and combinations thereof. Desirably, the substrate layer comprises polyethylene terephthalate. The substrate layer of the present invention generally consists of items such as antiseptic packaging films, corrosion protective films, vacuum and controlled atmosphere packages, blow molded containers, thermoformed containers, or electronic devices or display films—especially those made from or containing organic based semiconductors or conductors.

There is also provided in accordance with the present invention a barrier coating mixture comprising an aqueous dispersion of water, a non-elastomeric acrylic polymer, and a substantially exfoliated silicate filler material that has been treated with acid. Optional additives include surfactants, emulsifiers, anti-foaming agents, dispersing agents, wetting agents, leveling agents, thickeners, absorbers and getters. The dispersion is typically an emulsion, a suspension or a latex. The dispersion usually has a total solids content of from about 5 to about 30%, where the silicate comprises between about 10% to about 50% of the solids content. A film which is made from the dried coating mixture of the present invention is also contemplated.

There is also provided for in the present invention a method of making a barrier coating mixture comprising the steps of providing a first dispersion containing substantially polymerized non-elastomeric acrylic resin; providing a second dispersion containing substantial exfoliated silicate filler, where the second dispersion is substantially free of reactive acrylic monomer; and mixing the first dispersion with the second dispersion. The method may also include the step of treating the silicate with acid, where the acid is preferably glycine. Typically, the first dispersion contains a wetting agent.

In yet another aspect of the present invention is a method of producing an acrylic barrier coating film whereby an aqueous dispersion is applied to a substrate. The dispersion comprises a non-elastomeric acrylic polymer, a substantially exfoliated silicate filler material that has been treated with acid, and optionally, one or more of a surfactant, emulsifier, anti-foaming agent, dispersing agent, wetting agent, leveling agent, thickener, absorber or getter. The dispersion is then dried to a film having a like polymer to filler ratio as was present in the dispersion, and the film has a n oxygen permeability that is at least 50 times less that that of a like film formed without the silicate filler.

Other aspects and advantages of the present invention are described in the detailed description below and in the claims.

DETAILED DESCRIPTION OF THE INVENTION

The present invention is unique in that it provides for coated articles, coatings, films, and coating formulations that achieve substantial reductions in permeability and/or permeation rate by providing a dispersion of exfoliated silicates and acrylic polymers. The subsequent films, coatings, and coated articles can provide improved barrier properties in several applications, and are particularly suitable for packaging and electronic applications.

The results obtained with non-elastomeric acrylic polymers (the subject of this invention) are surprising even when viewed relative to the elastomeric nanocomposite formulations of U.S. Pat. No. 6,087,016, "Barrier Coating of an Elastomer and a Dispersed Layered Filler in a Liquid Carrier" Jul. 11, 2000 to Feeney, et al. The results are unexpected because aqueous dispersions of non-elastomeric polymers usually retain their spherical morphology through the process of forming a film from the aqueous dispersion. This means that one would expect it to be very difficult to get good dispersion of the exfoliated filler in the final coating, and one skilled in the art would expect that the filler would coalesce at the interfaces between the polymer particles during film formation. The large reductions in barrier properties that have been achieved indicate that this coalescence did not occur to a large enough extent to limit the reduction in permeability.

The present invention is described in detail below with reference to the various examples. Modifications to particular examples within the spirit and scope of the present invention, set forth in the appended claims, will be readily apparent to those of skill in the art.

Unless otherwise indicated, terms are to be construed in accordance with their ordinary meaning. Following are some exemplary definitions of terms used in this specification and the appended claims.

I. Definitions

"Acrylic" is a generic term denoting derivatives of acrylic and methacrylic acid, including acrylic esters and compounds containing nitrile and amide groups. Traditional monomers include: acrylic acid, methacrylic acid, itaconic acid, acrylamide, acrylonitrile and maleic anhydride; and acrylic esters such as ethyl, methyl, butyl, ethyl-hexyl acrylates and methacrylates. For the purposes of this invention, the term "acrylic" also includes copolymers of the above monomers with vinylics, styrenes, olefins such as ethylene, propylene, etc., and the like.

As used herein, the phrase "non-elastomeric polymer," and like terminology, includes those polymeric materials with glass transition temperatures ($T_g$) above room temperature, i.e., 23° C., and/or with crystallinity above 10%. Typically, non-elastomeric polymers can be viewed as polymers that even when properly crosslinked and not filled with inorganic fillers cannot be stretched at room temperature to twice their length and then return to their original shape. This definition refers to the properties of the polymer, and not to the filled or final nanocomposite coating.

The term "nanocomposite" or "filled polymer nanocomposite" refers to the mixture of substantially exfoliated filler and polymer. The thickness of at least some filler particles is below 1 micron, and probably well below 100 nm.

"Exfoliation" is defined for layered fillers as the separation of individual layers of the original particle. The fillers are exfoliated so that the polymer may surround each particle. Desirably, a sufficient amount of polymer is present between each platelet, that the platelets are randomly spaced. Preferably, no X-ray line appears because of the substantially random spacing of exfoliated platelets. In some circumstances, the filler can exfoliate when dispersed in an aqueous or non-aqueous medium. This would result in a higher aspect ratio than that of a solid particle before dispersion.

"Mesoscopic domains" means that the plates form locally oriented domains where the platelets are well aligned. Macroscopic domains can be seen when suspensions of particles forming mesoscopic domains are viewed through cross polarizers. These domains become difficult to see when polymer is dispersed in the water.

"Aspect ratio" is defined as the product of the lateral dimension of a platelet filler particle, e.g., mica flake, divided by the thickness of the platelet. The term "aspect ratio," as used herein, refers to this characteristic of substantially exfoliated silicates as they are typically found when dispersed in water. "High aspect ratio" refers to a platelet filler whose lateral dimension divided by thickness is greater than 25. The aspect ratio of any filler is an inherent property of the selected filler. For example, MICROLITE® 963 aqueous vermiculite solution [See EP Application No. 601,877, published Jun. 15, 1994] has a characteristic aspect ratio of about 10,000 or dimensions of 10-30 μm×10, as reported by W R Grace in their product literature and determined from electron micrographs. This is consistent with the observation of locally oriented mesoscopic domains in suspension (in water) containing only 0.02 weight % MICROLITE.

A "barrier coating mixture" includes a liquid containing suspended solids, which is used to apply the solids to a substrate. This includes a colloidal dispersion, suspension, emulsion and latex as they are conventionally defined. For example, by "colloidal dispersion or latex" is meant any dispersion or suspension of particles in liquid, the particles being of a size greater than molecular scale, e.g., about 0.001 to about 0.1 micron. An emulsion generally contains particles of about 0.05 to 1.0 microns, in liquid. A "suspension" generally contains particles of greater than 1.0 micron in liquid. A novel aspect of the present invention is that the barrier coating mixtures provide a better dispersion of platelet fillers in liquid at an unusually low solids content, e.g., between about 1 to about 30% solids as described in more detail below. According to this invention, once the "coating mixture" is dried, it is sometimes referred to as a "dried coating" or a "film".

The term "substrate" or "article" coated by these coatings includes, without limitation, materials such as films, particularly packaging films (including antiseptic, corrosion protective, vacuum and controlled atmosphere packages), blow molded or thermoformed containers and articles, electronic devices and/or displays and other surfaces, and the like.

"Oxygen permeability," as used herein, refers to a property of a material that describes the ease with which oxygen gas transmits through a film made of the material. The acrylic nanocomposite films of the present invention have an oxygen permeability that is at least 50 times that of like films (of the same thickness) which contain no silicate filler.

II. The Barrier Coating

A barrier coating mixture according to this invention includes the following components:
 (a) water
 (b) a non-elastomeric acrylic polymer;
 (c) a substantially exfoliated silicate filler material that has been treated with acid; and
 (d) optionally one or more additives, selected from the group consisting of surfactants, emulsifiers, anti-foaming agents, dispersing agents, leveling agents, thickeners, absorbers and getters.

These barrier coating mixtures result in films with reductions in permeability of 50 times to as high as 10,000 times or even higher relative to the unfilled acrylic polymer. These results are substantially higher than the prior art on other platelet filled barrier coatings.

The coating formulations and subsequent nanocomposite barrier coatings that are formed from them are unique in the following respects:
 1. The polymer used is not elastomeric—(surprising that the dispersed polymer particles can deform to form the nanocomposite barrier film);
 2. The exfoliated filler has been treated with acid and, generally, has not been organically functionalized by an ion exchange process with organic cations, as is typically performed in the art.
 3. The concentration and aspect ratio of the exfoliated filler in the dispersion is typically chosen so that it forms mesoscopic domains. This facilitates the orientation of the platelets in the final nanocomposite coating, leading in part to the large improvements in barrier properties;
 4. The concentration of filler can be high (up to 60% relative to the total solids weight) also leading to large reductions in permeability.

The barrier coating mixtures of this invention are characterized by a balancing of several critical features, i.e., appropriate dispersion of the filler in the non-elastomeric acrylic polymer, orientation of the filler platelets in the non-elastomeric polymer, as well as high aspect ratio of the filler, in order to achieve the desired permeability reductions in the dried barrier coating. The barrier coating mixtures of this invention desirably contain an unusually low total solids content, i.e., between about 1% and about 30% solids. A more desirable range of solids content is between about 5% to about 25% solids. The solids content is an important consideration in the barrier coatings compositions and performance of the dried coatings because the solids content effects the dispersion of the high aspect ratio filler. If high total solids content is used in the barrier coating composition, one would not achieve well dispersed filler, e.g., vermiculite or montmorillonite, and the permeability reductions characteristic of the coatings of this invention, and reported in the examples and figures herein, are not achieved. The preferred range of solid content is unexpectedly well below that typically used in the coating industry and therefore not predicted by the prior art teachings concerning barrier coatings formulations.

The total solids content of the coating mixtures of this invention is preferably less than 30% with the silicate filler comprising 5-60% of the total, particularly when the polymer is a non-elastomeric polymer such as an acrylic polymer as defined below, and the filler is a vermiculite or montmorillonite suspension. Examples 1-34 indicate a variety of desirable compositions of this invention.

Preferably, in the dried barrier coating (film), the acrylic polymer is present at between about 65 to about 95% by weight, the layered filler is present at between about 5 to about 35% by weight and the acid is present at between about 5 to about 40% by weight.

A. The Non-Elastomeric Polymer

Non-elastomeric acrylic polymers useful in forming barrier coating mixtures of this invention include polymers of acrylates, methacrylates, acrylonitrile, acrylamides, methacrylamides, copolymers thereof and optionally containing vinyls, styrenes and olefins.

Without being bound to any particular theory, Applicants believe the fact that the approach described in this invention works with these non-elastomeric acrylic polymers is surprising. When a dispersion of non-elastomeric polymer forms a coating it typically goes through several stages. First, the coating forms and dries to a collection of spherical particles of polymer separated by surfactant. When heated to higher temperatures, the particles deform to become more space filling. Eventually, polymer inter-diffuses through the regions containing surfactant to form a fully coalesced film. When there is a substantial amount of exfoliated nanodispersed filler in the initial formulation, it is surprising that these relative rigid dispersed spherical particles of polymer (as compared to elastomeric polymers described in U.S. Pat. No. 6,087,016 to Feeney et al) deform in order to make a nanocomposite film with the platelet filler particles. The large reductions in permeability that have been seen are evidence that this phenomena occurs. On the other hand, the films have not been heated to the melting point, and the detailed mechanism is not fully understood at this time.

The acrylics used in accordance with the present invention are typically in the form of an emulsion (also known as a latex). Polymer emulsions are colloidal dispersions of submicroscopic polymer particles in a continuous medium. The best known example is the natural latex produced by the rubber tree (*Hevea brasiliensis*) which is still an important source of one of the world's most widely used polymers. Man-made latexes, comprising dispersions of polymer particles in water, are used in synthetic rubber, impact polymers, adhesives, latex paints, paper coatings, carpet backing, binders for non-woven fabrics, printing inks, reinforcement of cement mortar, and immunodiagnostic tests. Inverse latexes, comprising dispersions of hydrophilic polymers in organic media, are prepared for their polymer which is used in flocculation of colloidal dispersions, water and mineral flotation, and enhanced oil recovery.

The range of emulsions also includes vinyl acetate polymers (encompassing polyvinyl acetate and ethylene vinyl acetate), acrylics and styrene-butadiene (SB) latex.

The major classes of acrylics are based on pure acrylics, vinyl acrylics and styrene acrylics. These can be derived from acrylates, methacrylates, vinylics and styrenics and their various copolymers. There also exist other copolymers of these acrylics with monomers derived from acrylamides, methacrylamides, acrylonitrile, olefins such as ethylene, and the like. Particularly preferred acrylics include acrylate polymers and copolymers with acrylamide, styrene, vinyl esters and urethanes. Still more particularly preferred acrylics are self-crosslinking types that include hydroxyl groups, expressed as a hydroxyl number ranging from 1 to 50, preferably 10-40, most preferably 15-30. Standard methods for determining hydroxyl numbers are based upon the derivatization of the hydroxyl groups with phthalic or acetic anhydride. Excess reagent is hydrolyzed to acid which is titrated with standardized base and the hydroxyl number is calculated from the difference in titers between sample and blank.

Crosslinking emulsions were developed to improve the film properties, particularly chemical resistance, in selected applications. There are two-component crosslinking systems where one of the crosslinking components is added just before application of the dispersion. Alternatively, there are self-crosslinking (one pot) systems where all reactive components are present and long-term storage stable. The crosslinking reaction can be triggered by the evaporation of water upon drying, a change of pH, or by curing at elevated temperature, where the crosslinking reaction is faster, or reactive groups are de-blocked. Examples of suitable crosslinking systems are the reaction of azeridines with acid groups on the polymer backbone, the reaction of hydroxyl functionality on the backbone with post added isocyanates or melamines, the reaction of amines with epoxy functionality where either can be on the polymer backbone, the auto-oxidation of incorporated fatty acid groups, the self condensation of alkoxy-silane functionality, the self condensation of n-methylolacrylamide metal-ion coordination with backbone functional groups such as acetoacetoxy groups or acid groups, and the reaction of acetoacetoxy groups with amines or acetoacetoxy groups with unsaturated groups in a Michael reaction.

The polymer is preferably capable of forming a dispersion, latex, suspension or emulsion in water, or a mixture of water with a solvent. Particularly preferred non-elastomeric polymers are acrylics such as DORESCO TAW4-39 and DORESCO TAW7-1 from Lubrizol Dock Resins. Coating mixtures of the invention employing these polymers are specifically exemplified below.

B. The Filler

The coating mixtures of this invention as described above also include a dispersed layered acid treated filler which, upon mixture, has an inherently high aspect ratio, which can range from about 25 to as high as about 30,000. The presently preferred fillers are vermiculite and montmorillonite. Examples of other suitable fillers include exfoliated silicates, for example, bentonite, nontronite, beidellite, volkonskoite, hectorite, saponite, laponite, sauconite, magadiite, kenyaite, ledikite and mixtures thereof.

MICROLITE® vermiculite and montmorillonite SCPX2041 from Southern Clay Industries are the preferred fillers because of their very high aspect ratios. MICROLITE® 963 is a water-based vermiculite dispersion (W. R. Grace) [See, EP Application No. 601,877, and published Jun. 15, 1994] which is a 7.5% by weight aqueous solution of dispersed vermiculite, which has an aspect ratio around 10,000. SCPX2041 is a 2.1% by weight aqueous solution of dispersed montmorillonite, with an aspect ration ranging from about 100 to about 250. One novel aspect of the mixtures of the present invention is the aspect ratio of the selected filler in the dried coating. According to this invention, in the dried coating, the filler remains substantially dispersed and well orientated. In the dried coatings of this invention, the layered filler is present at a minimum of about 5% by weight to a maximum of about 60% of the dried coating. The compositions of the present invention, when dried, retain the filler in well-dispersed form, resulting in a large reduction in permeability. On the other hand, we do not have any direct measure (such as x-ray) indicating the degree to which the filler remains exfoliated. The large improvements in barrier properties that are achieved are taken as the best evidence that the filler is well dispersed and oriented.

The vermiculite plates have an average lateral size of between 10 and 30 microns. The plates are largely exfoliated in water, and thus their thickness is 1-3 nm. The aspect ratio of the filler in water dispersion is an average of 10,000-30,000. It is clear that many plates reassemble during the coating and drying process of the present invention. However, it is a great advantage to start with as large an aspect ratio as possible. The selection and use of other known silicates which have properties similar to those of MICROLITE® vermiculite, as well as sufficiently high aspect ratios, are expected to be obvious to one of skill in the art following the teachings of this invention.

Large aspect ratio platelets in the filler can be locally oriented. The mesoscopic nature of the suspended plates is a direct consequence of the aspect ratio. A simple demonstration of the large aspect ratio of MICROLITE® 963 is the fact that oriented macroscopic domains can be observed when it is dispersed in water at a concentration of 0.02% by weight, or 0.01% by volume. The concentration above which a platelet filler will be locally oriented in suspension is given approximately by 1/aspect ratio. Thus fillers that start with an aspect ratio of 25 would have to be deployed above 4% by volume in a dispersion to achieve high local orientation.

MICROLITE® 963 vermiculite (W. R. Grace) is one preferred silicate, although good results may also be achieved with other exfoliated grades of MICROLITE® vermiculite (i.e., grades 963++, 923, and 903). Other layered silicates are also useful in the barrier coatings and films of this invention. In particular are SOMASIF™ ME-100 from CO-OP Chemical co. Ltd. (Tokyo, Japan) and SCPX-2041 from Southern Filler Products (Gonzales, Tex.). The effectiveness of other silicates in the barrier coating of this invention depends upon the lateral size of the platelets, the degree of exfoliation in water, and the degree to which they reassemble to form larger particles during the coating and drying process.

The barrier coating includes a pre-treatment of the exfoliated silicate filler with acid. While there is not yet a full understanding of the mechanism that takes place between the acid and the filler particles, the key reasons to use such a treatment include:

1. Improved compatibility of the aqueous polymer dispersion and the aqueous dispersed filler. This is still quite different from other work aimed at improving the compatibility of the polymer and the filler. Organic groups are not being put on the flat surface to the filler in any significant amount (because those groups are negatively charged and wouldn't stick to that surface).

2. Improved stability of the coating formulation.

In both cases, the acid treatment can modify the detailed interaction among filler particles, and between the filler and the polymer dispersed in the water. It may also modify the interaction with surfactants and thickeners. Although these interactions are not fully understood, the improvements observed probably arise from one or both of the following mechanisms:

a) Chemical modification of the filler—i.e. the attachment of acid groups to the edges or at defects in the filler structure. In addition, the treatment may remove metal ions from the filler, further changing its interaction with charged surfactants and other components in the formulation b) Physical changes in the plate structure: If the acid treatment locally modifies the filler at defects and or impurities, it may cause the plates to bend. If the plates are not flat, they will have regions where they are in contact. On the other hand, they cannot fully agglomerate into larger filler particles when they are not flat. These types of physical changes are consistent with observation of changes in viscosity and stability when the filler is treated. Physical changes such as those described are also consistent with the fact that the changes are not reversible when an acid treated filler is subsequently treated with a base. If physical changes are critical to improved properties, such changes may be achieved by methods other than acid or base treatment.

C. Surfactants and Other Additives

Coating mixtures of this invention can also contain at least one or more than one suitable surfactant to reduce surface tension. Surfactants include materials otherwise known as wetting agents, anti-foaming agents, emulsifiers, dispersing agents, leveling agents etc. Surfactants can be anionic, cationic and nonionic, and many surfactants of each type are available commercially. A suitable surfactant for inclusion in these compositions possesses a critical micelle concentration sufficiently low to ensure a dried coating uncompromised by residual surfactant. Preferably, the surfactant(s) useful in the methods and dispersions of this invention are nonionic, particularly useful with a highly charged filler, such as vermiculite. In the event of an unfavorable interaction of the anionic emulsifier present in the latex dispersion, any additional ionic additives must be kept to a minimum. This variable is eliminated where the surfactant or emulsifier is non-ionic. Increase in ionic concentration of the compositions containing vermiculite, such as by the addition of a base to adjust pH, e.g., KOH, $NH_4OH$ and NaOH can cause agglomeration of the filler, which adversely affects permeability reduction.

Cationic surfactants that can ion exchange with the alkali metal counterions present in the layered silicates have not been used. They will typically make the filler surface hydrophobic, and thus make a stable water suspension impossible. Limited quantities of cationic surfactants may be included as long as they don't adversely affect the coating formulation stability.

Desirable surfactants employed in the examples below are ERANOL 345 (Enviro Resins and Additives), SURFYNOL PSA 336 (Air Products and Chemicals, Inc.) and FOA-MASTER® VL defoamer (Henkel), among others.

Other suitable surfactants may also be selected. The amount and number of surfactants added to the coating dispersion or composition will depend on the particular surfactant(s) selected, but should be limited to the minimum amount of surfactant that is necessary to achieve wetting of the substrate while not compromising the performance of the dried coating. For example, typical surfactant amounts can be less than or equal to about 15% by weight of the dried coating.

Alternatively, the same surfactant molecule can be chemically bonded to the polymer as 1) a copolymer moiety or 2) an added reactive moiety that can later react with the polymer.

Other optional components of the coating mixture include conventional agents to adjust pH, such as bases for example, $NH_4OH$, NaOH or KOH, among others or acids for example, acetic acid, glycine or citric acid, among others provided that care is taken to avoid agglomeration, as discussed above.

In another embodiment, thickeners may be used in the coating formulations to adjust viscosity. One of skill in the art would readily determine and adjust the type and amounts of thickener depending on the type and amount of filler employed in the coating mixture based on the teachings contained herein.

When a film or coating limits the diffusion of any molecule or chemical, it is well known that the penetration of the said molecule can be further reduced by the addition of absorbers or getters to either the coating, or in a layer or material below the coating. This concept is used commercially in Honeywell's AEGIS™ Nylon films to block the diffusion of oxygen. It is clear that the same concept can be used in conjunction with nanocomposite coatings to block the penetration of oxygen, water, chemical warfare agents, or any other material. The use of such absorbers will not have a large effect on the steady state permeability, but it will primarily affect the time it takes for the first molecules to diffuse through the system. This breakthrough time is most important in packaging, chemical protective, and electronic applications.

D. The Carrier Liquid

The coating mixtures of this invention are present in a suitable carrier liquid that is predominantly water. Combinations of water with an organic carrier may also be used as the carrier liquid. Examples of suitable organic carriers could include hexane, heptane, toluene, isopropyl alcohol, cyclohexanone, ethanol, methanol, other hydrocarbons, and combinations thereof. Selection of a suitable organic solvent carrier is within the skill of the art.

E. Embodiments of Barrier Mixtures

One example of a barrier coating mixture useful for application to a substrate or interface according to this invention is a barrier coating mixture comprising: (a) a non-elastomeric acrylic polymer; (b) a substantially exfoliated silicate filler that has been treated with acid; and (c) optionally one or more additives. These barrier coating mixtures result in films with reductions in oxygen-permeability of 50 times to as high as 10,000 times or even higher relative to the unfilled polymer. These results are substantially higher than the prior art on other platelet filled barrier coatings.

In a preferred embodiment, the coating mixtures described above have total solids contents equal to or less than 30%, with the filler comprising from 5-60% of the total solids, between about 5 and 40 weight % acid and between about 0.1% to about 15% by weight of additive(s) in the solid content. The dried coatings of the mixtures described above, contain fillers which reduces the oxygen permeability greater than 50-fold that of the dried, unfilled polymer alone.

One preferred coating mixture useful in this invention has a solids content of between about 5 to about 25% by weight and the dried coating comprises between about 65% to about 95% by weight of a water dispersed non-elastomeric polymer, between about 5% to about 35% by weight of a vermiculite or montmorillonite filler, between about 5 and 40 weight % acid and between about 0.1% to about 15% total additive weight percent. As described in examples below, the selected polymers are acrylics, such as DORESCO TAW4-39 and DORESCO TAW7-1 acrylic emulsions from Lubrizol Dock Resins.

A further advantage of the above Lubrizol acrylics is the thixotropic nature of the coating mixture thus formed. A thixotropic material is shear thinning. That is, under stress (such as stirring or mixing) a thixotropic material will undergo a viscosity reduction and become more fluid. Thus, in preferred embodiments, the coating suspensions of this invention form a gel on standing and become fluid on stirring. This gel is advantageous in that it provides further stability to the dispersed clay particles during storage and shipment.

Additional preferred barrier coating mixtures useful in this invention may be prepared by methods described in detail in Examples 1-34.

III. The Coated Article

Once prepared as described in detail in Examples 1-34 below, the coating mixtures may be applied to a suitable substrate to reduce the gas permeation rate through the substrate. Upon drying, the dried coating may include the acrylic polymer in the mixture at a weight percent of at least about 65%. The filler is preferably present in said mixture when dried at greater than about 5% by weight, between about 5 and 40 weight % acid and between about 0.1% to about 15% total additive weight percent. The dried coating reduces the oxygen permeability greater than 50-fold that of the dried, unfilled polymer alone. As indicated in Examples 1-34, reductions in permeability attributed to compositions of this invention can range from approximately 100 times to about 10,000 times or even higher that of unfilled polymer alone. The reduction in permeation rate for the coated article will depend upon the thickness and permeability of the article, as well as the thickness and permeability of the barrier coating film.

Examples of desirable substrates include films, particularly packaging films (including antiseptic, corrosion protective, vacuum and controlled atmosphere packages), blow molded or thermoformed containers and articles, electronic displays and other surfaces. The substrate may suitably comprise polymers such as polyesters, polyamides, chlorinated polymers, polyolefins, polyurethanes, polyethers, polyketones, polycarbonates, vinylics (such as vinyl acetate and vinyl chloride), styrenes, fluoropolymers, and combinations thereof.

IV. Methods of Coating a Substrate or Forming a Film

The articles to be coated by the compositions of the invention may be previously untreated or may have a variety of pre-treatments to their surfaces, depending upon the identity and utility of the article. For example, the article may have on at least one side a heat seal layer. Such heat seal layers may be made of an ethylene-propylene copolymer or ethylene-propylene-butylene terpolymer. Thus, the coating dispersion is applied on the surface of the heat seal layer. Alternatively, the substrate or article may comprise a protective topcoat layer, such as polyurethane or fluoropolymers such as TEFLON®-type materials [DuPont] for abrasion resistance, etc. Such topcoats may be selected by one of skill in the art. The coatings of this invention may be applied over or under the topcoat layer.

Alternatively, the coating mixtures of the invention may be applied to a releasable mold in order to form a film, rather than a coated article. The film thus consists of a dried mixture of the above-described polymer and typically greater than 5% by weight of the layered filler having an aspect ratio greater than 25. The film, which may be in the form of a membrane, may itself be employed as a gas barrier layer for use in various laboratory procedures, or as a glove or balloon material. Such a dried, free-standing film or membrane is characterized by a reduction in oxygen permeability greater than 50-fold the permeability of a film formed of the dried polymer alone.

To form the coated article or free-standing film of this invention, the coating mixtures of this invention may be applied to the selected surface or article by techniques including, without limitation, roll coating, spray coating, brush coating and dip coating techniques. Roll coating techniques include, but are not limited to, rod, reverse roll, forward roll, air knife, knife over roll, blade, gravure and slot die coating methods. General descriptions of these types of coating methods may be found in texts, such as Modern Coating and Drying Techniques, (E. Cohen and E. Gutoff, eds; VCH Publishers) New York (1992) and Web Processing and Converting Technology and Equipment, (D. Satas, ed; Van Nostrand Reinhold) New York (1984). Three dimensional articles may preferably be coated by the techniques which include, but are not limited to, spray coating or dip coating. The method of application is not a limitation on the present invention, but may be selected from among these and other well-known methods by the person of skill in the art. However, the coating must be applied so that drying takes place on the substrate and not in the air (i.e. powder coating). If drying takes place during spraying or other means of application, agglomeration may occur.

The coating mixtures may be applied to a substrate or a mold at any desired thickness, depending on the substrate, the purpose for which the coating is being applied and the ultimate use of the coated article. Thus, for example, the coating mixtures of the present invention may be applied to an article or substrate by the methods described above to form a dried coating of a thickness between about 0.1 µm to about 200 µm of dry coating. Such adjustments are well within the skill of the art [See, e.g., Canadian Patent No. 993,738].

After coating, the coated article or mold may be dried at a selected temperature, e.g., room temperature or greater than room temperature. The selection of the drying temperature, relative humidity, and convective air flow rates depends on the desired time for drying; that is, reduced drying times may be achieved at elevated air temperatures, lower relative humidity and higher rates of air circulation over the drying coating surface. One of skill in the art can readily adjust the drying conditions as desired.

The dried coatings exhibit a surprising reduction in permeability compared to the prior art and particularly compared to unfilled polymers. As evidenced in the Examples below, reductions in permeability caused by the dried coatings of this invention are shown to be from about 50 fold to 15,000 fold and even higher relative to the unfilled polymers alone. The evaluation of gas permeability of the coatings of the present invention is determined using the following parameters. The oxygen transmission rate (OTR) of the dried coating on the article, or the free-standing film, is generally measured using conventional apparatus, such as a Mocon OX-TRAN 2/20 module. OTR units are cc/m$^2$-day at 1 atmosphere, 0% relative humidity at 23° C. The permeability of the coating is calculated by multiplying the OTR and coating thickness. Permeability units are cc-mm/m$^2$-day atmosphere at 0% relative humidity at 23° C. If the coating is on a known substrate, the permeability of the known substrate is subtracted out using the following equation:

$$\text{Permeability of the barrier coating} = X_1/[(1/OTR)-(X_2/P_{X2})]$$

where $X_1$ is barrier coating thickness; $X_2$ is substrate thickness and $P_{X2}$ is permeability of the substrate. The reduction in permeability from the unfilled polymer is calculated by dividing the permeability of the unfilled polymer by the permeability of the filled polymer. Reduction in permeability is a unitless ratio.

Experimental Procedures

EXAMPLES 1-34, CONTROLS A-K AND COMPARATIVE EXAMPLE a) Oxygen Transmission Rate Testing Films and coated substrates are tested for oxygen transmission rate using a MOCON® OXTRAN 2/20 or 2/60 module at 23° C. and 0% RH or 30° C. and 70% RH. The samples are loaded onto the modules and conditioned for 2 hours prior to testing for oxygen. Once equilibrium is reached, an OTR (oxygen transmission rate) is reported in units of cc/m² day atm.

b) Thickness Measurements

The thickness of the coating on a substrate is measured after the OTR is reported. Each sample is removed from the Mocon module and a circle of specified size cut from the sample. The cut circle is weighed. The weight of the coating is obtained from subtracting the weight of the uncoated circle and the thickness calculated from the size of the circle and weight of the coating. For coating thickness less than 5 microns, the thickness is measured using an optical profilometer. The thickness of the film is reported in millimeters and used to calculate the permeability of the film.

c) Permeability Calculations

Permeability is calculated using the thickness of the film and the OTR of the sample in the following equation:

Coating Permeability=(coating thickness)/[(1/*OTR*)−(substrate thickness/substrate permeability)].

The benefit of obtaining the permeability of the coating versus the OTR of the sample is that permeability reports the OTR at a specified thickness. Therefore, different coatings can be compared directly. This is important when determining the performance of a coating on varying substrates and at different thicknesses.

Comparative Example

NeoRez R600 Urethane-Ether Copolymer with Glycine Treated MICROLITE Filler

An aqueous barrier coating solution according to this invention is prepared as follows, in which the matrix is Neo-Rez R600 polymer (NeoResins, Inc., 33.0% polymer by weight) and the filler is MICROLITE® exfoliated silicate (7.5% filler by weight). The filler was treated in this example with 30.7% glycine by weight filler and stirring for 1 hour.

In an 8 oz jar, 26.25 grams of MICROLITE 963 was mixed with 3.14 grams of glycine (Lab Safety Supply, 20% glycine by weight) and 15.61 grams of distilled water. The resulting solution was stirred with a stir bar for 1 hour.

To the above solution, 9.17 grams of NeoRez R600, 20.73 grams of distilled water and 0.1 grams of OCTOWET 70PG (Tiarco Chemical Co., 70.3%) was added. The resulting solution was stirred with a stir bar for 1 hour. The at room temperature is ready for application, e.g., spray-coating, onto a plastic or rubber substrate. The coating mixture has 7.65% solids in water content.

After this coating solution is applied to a PET film substrate and allowed to dry, the coating contains 52.4% by weight NeoRez R600, 35.5% by weight filler, 1.2% OCTOWET 70PG wetting agent, and 10.9% by weight glycine.

The oxygen transmission rate (OTR) is measured using a MOCON® OX-TRAN 2/20 module. The OTR is 73.5 cc/m² day @ 1 atmosphere, 0% RH, 23° C. Permeability of the 1.2 micron NeoRez R600 nanocomposite is 0.24 cc mm/m² day atmosphere @ 0% RH, 23° C. The oxygen transmission rate (OTR) is also measured using a MOCON® OX-TRAN 2/20 module at 30° C. and 70% RH. The OTR is 63.0 cc/m² day @ 1 atmosphere, 70% RH, 30° C. Permeability of the 1.75 micron NeoRez R600 nanocomposite is 0.24 cc mm/m² day atmosphere @ 70% RH, 30° C.

Example 1

JONCRYL 3030 Acrylic with Glycine Treated MICROLITE Filler

An aqueous barrier coating solution according to this invention is prepared as follows, in which the matrix is JONCRYL 3030 acrylic polymer (Johnson Polymer, LLC, 46.6% polymer by weight) and the filler is MICROLITE® exfoliated silicate. The filler was treated in this example with 30.7% glycine by weight filler and stirring for 1 hour.

In an 8 oz jar, 26.25 grams of MICROLITE 963 was mixed with 3.14 grams of glycine (Lab Safety Supply, 20%) and 15.61 grams of distilled water. The resulting solution was stirred with a stir bar for 1 hour.

To the above solution, 6.49 grams of JONCRYL 3030, 23.36 grams of distilled water and 0.15 grams of OCTOWET 70PG (Tiarco Chemical Co., 70.3%) was added. The resulting solution was stirred with a stir bar for 1 hour. The resulting dispersion at room temperature is ready for application, e.g., spray-coating, onto a plastic or rubber substrate. The coating mixture has 7.74% solids in water content.

After this coating solution is applied to a PET film substrate and allowed to dry, the coating contains 52.1% by weight JONCRYL 3030, 35.3% by weight filler, 1.8% OCTOWET 70PG wetting agent, and 10.8% by weight glycine.

The oxygen transmission rate (OTR) is measured using a MOCON® OX-TRAN 2/20 module. The OTR is 62.4 cc/m² day @ 1 atmosphere, 0% RH, 23° C. Permeability of the 1.25 micron JONCRYL 3030 nanocomposite is 0.17 cc mm/m day atmosphere @ 0% RH, 23° C. The reduction in permeability of this coating is 236 times the reduction in permeability of the unfilled JONCRYL 3030 latex. The oxygen transmission rate (OTR) is also measured using a MOCON® OX-TRAN 2/20 module at 30° C. and 70% RH. The OTR is 75.9 cc/m² day @ 1 atmosphere, 70% RH, 30° C. Permeability of the 1.25 micron JONCRYL 3030 nanocomposite is 0.27 cc mm/m² day atmosphere @ 70% RH, 30° C.

Example 2

JONCRYL 3040 Acrylic with Glycine Treated MICROLITE Filler

An aqueous barrier coating solution according to this invention is prepared as follows, in which the matrix is JONCRYL 3040 acrylic polymer (Johnson Polymer, LLC, 45.8%) and the filler is MICROLITE® exfoliated silicate. The filler was treated in this example with 30.7% glycine by weight filler and stirring for 1 hour.

In an 8 oz jar, 26.25 grams of MICROLITE 963 was mixed with 3.14 grams of glycine (Lab Safety Supply, 20%) and 15.61 grams of distilled water. The resulting solution was stirred with a stir bar for 1 hour.

To the above solution, 6.61 grams of JONCRYL 3040, 23.24 grams of distilled water and 0.15 grams of OCTOWET 70PG (Tiarco Chemical Co., 70.3%) was added. The resulting solution was stirred with a stir bar for 1 hour. The resulting dispersion at room temperature is ready for application, e.g., spray-coating, onto a plastic or rubber substrate. The coating mixture has 7.74% solids in water content.

After this coating solution is applied to a PET film substrate and allowed to dry, the coating contains-52.1% by weight JONCRYL 3040, 35.3% by weight filler, 1.8% OCTOWET 70PG wetting agent, and 10.8% by weight glycine.

The oxygen transmission rate (OTR) is measured using a MOCON® OX-TRAN 2/20 module. The OTR is 35.3 cc/m$^2$ day @ 1 atmosphere, 0% RH, 23° C. Permeability of the 1.25 micron JONCRYL 3040 nanocomposite is 0.063 cc mm/m$^2$ day atmosphere @ 0% RH, 23° C. The reduction in permeability of this coating is 459 times the reduction in permeability of the unfilled JONCRYL 3040 latex.

Example 3

JONCRYL 3050 Acrylic with Glycine Treated MICROLITE Filler

An aqueous barrier coating solution according to this invention is prepared as follows, in which the matrix is JONCRYL 3050 acrylic polymer (Johnson Polymer, LLC, 47.9%) and the filler is MICROLITE® exfoliated silicate. The filler was treated in this example with 30.7% glycine by weight filler and stirring for 1 hour.

In an 8 oz jar, 26.25 grams of MICROLITE 963 was mixed with 3.14 grams of glycine (Lab Safety Supply, 20%) and 15.61 grams of distilled water. The resulting solution was stirred with a stir bar for 1 hour.

To the above solution, 6.32 grams of JONCRYL 3050, 23.53 grams of distilled water and 0.15 grams of OCTOWET 70PG (Tiarco Chemical Co., 70.3%) was added. The resulting solution was stirred with a stir bar for 1 hour. The resulting dispersion at room temperature is ready for application, e.g., spray-coating, onto a plastic or rubber substrate. The coating mixture has 7.74% solids in water content.

After this coating solution is applied to a PET film substrate and allowed to dry, the coating contains 52.1% by weight JONCRYL 3050, 35.3% by weight filler, 1.8% OCTOWET 70PG wetting agent, and 10.8% by weight glycine.

The oxygen transmission rate (OTR) is measured using a MOCON® OX-TRAN 2/20 module. The OTR is 57.9 cc/m$^2$ day @ 1 atmosphere, 0% RH, 23° C. Permeability of the 1.5 micron JONCRYL 3050 nanocomposite is 0.17 cc mm/m$^2$ day atmosphere @ 0% RH, 23° C. The oxygen transmission rate (OTR) is also measured using a MOCON® OX-TRAN 2/20 module at 30° C. and 70% RH. The OTR is 40.9 cc/m$^2$ day @ 1 atmosphere, 70% RH, 30° C. Permeability of the 1.75 micron JONCRYL 3050 nanocomposite is 0.11 cc mm/m day atmosphere @ 70% RH, 30° C.

Example 4

JONCRYL 3050 and JONCRYL 3040 Acrylic with Glycine Treated MICROLITE Filler

An aqueous barrier coating solution according to this invention is prepared as follows, in which the matrix is JONCRYL 3050 and JONCRYL 3040 acrylic polymer (Johnson Polymer, LLC, 47.9% & 45.8%) and the filler is MICROLITE® exfoliated silicate. The filler was treated in this example with 30.7% glycine by weight filler and stirring for 1 hour.

In an 8 oz jar, 22.75 grams of MICROLITE 963 was mixed with 2.72 grams of glycine (Lab Safety Supply, 20%) and 19.53 grams of distilled water. The resulting solution was stirred with a stir bar for 1 hour.

To the above solution, 2.73 grams of JONCRYL 3050, 2.86 grams of JONCRYL 3040, 24.01 grams of distilled water and 0.4 grams of OCTOWET 70PG (Tiarco Chemical Co., 70.3%) was added. The resulting solution was stirred with a stir bar for 1 hour. The resulting dispersion at room temperature is ready for application, e.g., spray coating, onto a plastic or rubber substrate. The coating mixture has 6.96% solids in water content.

After this coating solution is applied to a PET film substrate and allowed to dry, the coating contains 25.0% by weight JONCRYL 3050, 25.1% by weight JONCRYL 3040, 34.0% by weight filler, 5.4% OCTOWET 70PG wetting agent, and 10.4% by weight glycine.

The oxygen transmission rate (OTR) is measured using a MOCON® OX-TRAN 2/20 module. The OTR is 50.8 cc/m$^2$ day @ 1 atmosphere, 0% RH, 23° C. Permeability of the 1.0 micron JONCRYL 3050 nanocomposite is 0.090 cc mM/m$^2$ day atmosphere @ 0% RH, 23° C.

Example 5

HYCAR 26288 Acrylic with Acetic Acid Treated MICROLITE Filler

An aqueous barrier coating solution according to this invention is prepared as follows, in which the matrix is HYCAR 26288 acrylic polymer (Noveon, Inc, 49.8%) and the filler is MICROLITE® exfoliated silicate. The filler was treated in this example with 17.7% by weight filler and rolling for 3 days.

In an 8 oz jar, 24.93 grams of MICROLITE 963 was mixed with 0.344 grams of acetic acid (Brenntag Northeast, Inc.). The resulting solution was rolled for 3 days. After treatment, 7.14 grams of distilled water was added and stirred with a stir bar.

To the above solution, 6.08 grams of HYCAR 26288, 23.92 grams of distilled water and 0.1 grams of SURFYNOL 104E (Air Products and Chemicals, Inc, 100.0%) was added. The resulting solution was stirred with a stir bar for 1 hour. The resulting dispersion at room temperature is ready for application, e.g., spray-coating, onto a plastic or rubber substrate. The coating mixture has 7.21% solids in water content.

After this coating solution is applied to a PET film substrate and allowed to dry, the coating contains 55.9% by weight HYCAR 26288, 35.9% by weight filler, 1.8% SURFYNOL 104E wetting agent, and 6.35% by weight glycine.

The oxygen transmission rate (OTR) is measured using a MOCON® OX-TRAN 2/20 module. The OTR is 90.3 cc/m$^2$ day @ 1-atmosphere, 0% RH, 23° C. Permeability of the 0.8 micron HYCAR 26288 nanocomposite is 0.32 cc mm/rnM$^2$ day atmosphere @ 0% RH, 23° C. The reduction in permeability of this coating is 122 times the reduction in permeability of the unfilled HYCAR 26288 latex.

Example 6

HYCAR 26288 Acrylic with Glycine Treated MICROLITE Filler

An aqueous barrier coating solution according to this invention is prepared as follows, in which the matrix is HYCAR 26288 acrylic polymer (Noveon, Inc, 49.8%) and the filler is MICROLITE® exfoliated silicate. The filler was treated in this example with 30.7% glycine by weight filler and stirring for 1 hour.

In an 8 oz jar, 26.25 grams of MICROLITE 963 was mixed with 3.14 grams of glycine (Lab Safety Supply, 20%) and 15.61 grams of distilled water. The resulting solution was stirred with a stir bar for 1 hour.

To the above solution, 6.08 grams of HYCAR 26288, 23.92 grams of distilled water and 0.1 grams of ERANOL-345 (Enviro Resins and Additives, 100.0%) was added. The resulting solution was stirred with a stir bar for 1 hour. The resulting dispersion at room temperature is ready for application, e.g., spray-coating, onto a plastic or rubber substrate. The coating mixture has 7.73% solids in water content.

After this coating solution is applied to a PET film substrate and allowed to dry, the coating contains 52.2% by weight HYCAR 26288, 35.3% by weight filler, 1.7% ERANOL-345 wetting agent, and 10.8% by weight glycine.

The oxygen transmission rate (OTR) is measured using a MOCON® OX-TRAN 2/20 module. The OTR is 40.9 cc/m$^2$ day @ 1 atmosphere, 0% RH, 23° C. Permeability of the 1.2 micron HYCAR 26288 nanocomposite is 0.076 cc mm/m$^2$ day atmosphere @ 0% RH, 23° C. The reduction in permeability of this coating is 514 times the reduction in permeability of the unfilled HYCAR 26288 latex.

Example 7

HYCAR 26288 Acrylic with Glycine Treated MICROLITE Filler

An aqueous barrier coating solution according to this invention is prepared as follows, in which the matrix is HYCAR 26288 acrylic polymer (Noveon, Inc., 49.8%) and the filler is MICROLITE® exfoliated silicate. The filler was treated in this example with 30.7% glycine by weight filler and stirring for 1 hour.

In an 8 oz jar, 38.5 grams of MICROLITE 963 was mixed with 4.61 grams of glycine (Lab Safety Supply, 20%) and 13.14 grams of distilled water. The resulting solution was stirred with a stir bar for 1 hour.

To the above solution, 8.92 grams of HYCAR 26288, 9.83 grams of distilled water and 0.05 grams of ERANOL-345 (Enviro Resins and Additives, 100%) was added. The resulting solution was stirred with a stir bar for 1 hour. The resulting dispersion at room temperature is ready for application, e.g., spray-coating, onto a plastic or rubber substrate. The coating mixture has 11.2% solids in water content.

After this coating solution is applied to a PET film substrate and allowed to dry, the coating contains 52.8% by weight HYCAR 26288, 35.7% by weight filler, 0.6% ERANOL-345 wetting agent, and 11.0% by weight glycine.

The oxygen transmission rate (OTR) is measured using a MOCON® OX-TRAN 2/20 module. The OTR is 20.6 cc/m$^2$ day @ 1 atmosphere, 0% RH, 23° C. Permeability of the 1.1 micron HYCAR 26288 nanocomposite is 0.028 cc mm/m$^2$ day atmosphere @ 0% RH, 23° C. The reduction in permeability of this coating is 1396 times the reduction in permeability of the unfilled HYCAR 26288 latex. The oxygen transmission rate (OTR) is also measured using a MOCON® OX-TRAN 2/20 module at 30° C. and 70% RH. The OTR is 36.0 cc/m$^2$ day @ 1 atmosphere, 70% RH, 30° C. Permeability of the 1.3 micron HYCAR 26288 nanocomposite is 0.068 cc mm/m$^2$ day atmosphere @ 70% RH, 30° C.

Example 8

HYCAR 26288 Acrylic with Glycine Treated MICROLITE Filler

An aqueous barrier coating solution according to this invention is prepared as follows, in which the matrix is HYCAR 26288 acrylic polymer (Noveon, Inc., 49.8%) and the filler is MICROLITE® exfoliated silicate. The filler was treated in this example with 30.5% glycine by weight filler and stirring for 1 hour.

In an 8 oz jar, 42.0 grams of MICROLITE 963 was mixed with 5.0 grams of glycine (Lab Safety Supply, 20%) and 9.25 grams of distilled water. The resulting solution was stirred with a stir bar for 1 hour.

To the above solution, 9.74 grams of HYCAR 26288, 8.95 grams of distilled water and 0.05 grams of ERANOL-345 (Enviro Resins and Additives, 100%) was added. The resulting solution was stirred with a stir bar for 1 hour. The resulting dispersion at room temperature is ready for application, e.g., spray-coating, onto a plastic or rubber substrate. The coating mixture has 12.2% solids in water content.

After this coating solution is applied to a PET film substrate and allowed to dry, the coating contains 52.9% by weight HYCAR 26288, 35.7% by weight filler, 0.5% ERANOL-345 wetting agent, and 10.9% by weight glycine.

The oxygen transmission rate (OTR) is measured using a MOCON® OX-TRAN 2/20 module. The OTR is 22.68 cc/m$^2$ day @ 1 atmosphere, 0% RH, 23° C. Permeability of the 1.1 micron HYCAR 26288 nanocomposite is 0.031 cc mm/m$^2$ day atmosphere® 0% RH, 23° C. The reduction in permeability of this coating is 1261 times the reduction in permeability of the unfilled HYCAR 26288 latex. The oxygen transmission rate (OTR) is also measured using a MOCON® OX-TRAN 2/20 module at 30° C. and 70% RH. The OTR is 27.9 cc/m$^2$ day @ 1 atmosphere, 70% RH, 30° C. Permeability of the 2.0 micron HYCAR 26288 nanocomposite is 0.073 cc mm/m$^2$ day atmosphere @ 70% RH, 30° C.

Example 9

HYCAR 26288 Acrylic with Glycine Treated MICROLITE Filler

An aqueous barrier coating solution according to this invention is prepared as follows, in which the matrix is HYCAR 26288 acrylic polymer (Noveon, Inc., 49.8%) and the filler is MICROLITE® exfoliated silicate. The filler was treated in this example with 30.5% glycine by weight filler and stirring for 3 hours.

In an 8 oz jar, 42.0 grams of MICROLITE 963 was mixed with 5.0 grams of glycine (Lab Safety Supply, 20%) and 9.25 grams of distilled water. The resulting solution was stirred with a stir bar for 3 hours.

To the above solution, 9.74 grams of HYCAR 26288, 8.95 grams of distilled water and 0.12 grams of ERANOL-345 (Enviro Resins and Additives, 100%) was added. The resulting solution was stirred with a stir bar for 1 hour. The resulting dispersion at room temperature is ready for application, e.g., spray-coating, onto a plastic or rubber substrate. The coating mixture has 12.3% solids in water content.

After this coating solution is applied to a PET film substrate and allowed to dry, the coating contains 52.5% by weight HYCAR 26288, 35.4% by weight filler, 1.3% ERANOL-345 wetting agent, and 10.8% by weight glycine.

The oxygen transmission rate (OTR) is measured using a MOCON® OX-TRAN 2/20 module. The OTR is 21.9 cc/m$^2$ day @ 1 atmosphere, 0% RH, 23° C. Permeability of the 1.3 micron HYCAR 26288 nanocomposite is 0.035 cc mm/m$^2$ day atmosphere @ 0% RH, 23° C. The reduction in permeability of this coating is 1117 times the reduction in permeability of the unfilled HYCAR 26288 latex. The oxygen transmission rate (OTR) is also measured using a MOCON® OX-TRAN 2/20 module at 30C and 70% RH. The OTR is 33.3 cc/m$^2$ day® 1 atmosphere, 70% RH, 30° C. Permeability of the 1.2 micron HYCAR 26288 nanocomposite is 0.056 cc mm/m$^2$ day atmosphere @ 70% RH, 30° C.

Example 10

CARBOSET 514H Acrylic with Glycine Treated MICROLITE Filler

An aqueous barrier coating solution according to this invention is prepared as follows, in which the matrix is CARBOSET 514H acrylic polymer (Noveon, Inc., 40.0%) and the filler is MICROLITE® exfoliated silicate. The filler was treated in this example with 30.7% glycine by weight filler and stirring for 1 hour.

In an 8 oz jar, 26.25 grams of MICROLITE 963 was mixed with 3.14 grams of glycine (Lab Safety Supply, 20%) and 15.61 grams of distilled water. The resulting solution was stirred with a stir bar for 1 hour.

To the above solution, 7.57 grams of CARBOSET 514H, 22.43 grams of distilled water and 0.05 grams of SURFYNOL 104E (Air Products and Chemicals, Inc, 100%) was added. The resulting solution was stirred with a stir bar for 1 hour. The resulting dispersion at room temperature is ready for application, e.g., spray-coating, onto a plastic or rubber substrate. The coating mixture has 7.8% solids in water content.

After this coating solution is applied to a PET film substrate and allowed to dry, the coating contains 53.3% by weight CARBOSET 514H, 35.1% by weight filler, 0.9% SURFYNOL 104E wetting agent, and 10.8% by weight glycine.

The oxygen transmission rate (OTR) is measured using a MOCON® OX-TRAN 2/20 module. The OTR is 16.91 cc/m$^2$ day @ 1 atmosphere, 0% RH, 23° C. Permeability of the 1.1 micron CARBOSET 514H nanocomposite is 0.022 cc mm/m$^2$ day atmosphere @ 0% RH, 23° C. The reduction in permeability of this coating is 1200 times the reduction in permeability of the unfilled CARBOSET 514H latex.

Example 11

CARBOSET 514H Acrylic with Glycine Treated MICROLITE Filler

An aqueous barrier coating solution according to this invention is prepared as follows, in which the matrix is CARBOSET 514H acrylic polymer (Noveon, Inc., 41.1%) and the filler is MICROLITE® exfoliated silicate. The filler was treated in this example with 30.7% glycine by weight filler and stirring for 1 hour.

In an 8 oz jar, 38.5 grams of MICROLITE 963 was mixed with 4.61 grams of glycine (Lab Safety Supply, 20%) and 13.14 grams of distilled water. The resulting solution was stirred with a stir bar for 1 hour.

To the above solution, 10.80 grams of CARBOSET 514H, and 7.95 grams of distilled water was added. The resulting solution was stirred with a stir bar for 1 hour. The resulting dispersion at room temperature is ready for application, e.g., spray-coating, onto a plastic or rubber substrate. The coating mixture has 11.2% solids in water content.

After this coating solution is applied to a PET film substrate and allowed to dry, the coating contains 53.1% by weight CARBOSET 514H, 35.9% by weight filler, and 11.0% by weight glycine.

The oxygen transmission rate (OTR) is measured using a MOCON® OX-TRAN 2/20 module. The OTR is 14.9 cc/m$^2$ day @ 1 atmosphere, 0% RH, 23° C. Permeability of the 1.0 micron CARBOSET 514H nanocomposite is 0.017 cc mm/m$^2$ day atmosphere @ 0% RH, 23° C. The reduction in permeability of this coating is 1553 times the reduction in permeability of the unfilled CARBOSET 514H latex.

Example 12

CARBOSET 514H Acrylic with Glycine Treated MICROLITE Filler

An aqueous barrier coating solution according to this invention is prepared as follows, in which the matrix is CARBOSET 514H acrylic polymer (Noveon, Inc., 41.1%) and the filler is MICROLITE® exfoliated silicate. The filler was treated in this example with 30.7% glycine by weight filler and stirring for 1 hour.

In an 8 oz jar, 45.5 grams of MICROLITE 963 was mixed with 5.45 grams of glycine (Lab Safety Supply, 20%) and 5.3 grams of distilled water. The resulting solution was stirred with a stir bar for 1 hour.

To the above solution, 12.76 grams of CARBOSET 514H, and 5.99 grams of distilled water was added. The resulting solution was stirred with a stir bar for 1 hour. The resulting dispersion at room temperature is ready for application, e.g., spray-coating, onto a plastic or rubber substrate. The coating mixture has 13.2% solids in water content.

After this coating solution is applied to a PET film substrate and allowed to dry, the coating contains 53.1% by weight CARBOSET 514H, 35.9% by weight filler, and 11.0% by weight glycine.

The oxygen transmission rate (OTR) is measured using a MOCON® OX-TRAN 2/20 module. The OTR is 9.8 cc/m$^2$ day @ 1 atmosphere, 0% RH, 23° C. Permeability of the 1.35 micron CARBOSET 514H nanocomposite is 0.014 cc mm/m$^2$ day atmosphere @ 0% RH, 23° C. The reduction in permeability of this coating is 1886 times the reduction in permeability of the unfilled CARBOSET 514H latex.

Example 13

CARBOSET CR760 Acrylic with Glycine Treated MICROLITE Filler

An aqueous barrier coating solution according to this invention is prepared as follows, in which the matrix is CARBOSET CR760 acrylic polymer (Noveon, Inc., 40.7%) and the filler is MICROLITE® exfoliated silicate. The filler was treated in this example with 30.7% glycine by weight filler and stirring for 1 hour.

In an 8 oz jar, 45.5 grams of MICROLITE 963 was mixed with 5.45 grams of glycine (Lab Safety Supply, 20%) and 5.3 grams of distilled water. The resulting solution was stirred with a stir bar for 1 hour.

To the above solution, 12.89 grams of CARBOSET CR760, and 5.86 grams of distilled water was added. The resulting solution was stirred with a stir bar for 1 hour. The resulting dispersion at room temperature is ready for application, e.g., spray-coating, onto a plastic or rubber substrate. The coating mixture has 13.2% solids in water content.

After this coating solution is applied to a PET film substrate and allowed to dry, the coating contains 53.1% by weight CARBOSET CR760, 35.9% by weight filler, and 11.0% by weight glycine.

The oxygen transmission rate (OTR) is measured using a MOCON® OX-TRAN 2/20 module. The OTR is 18.5 cc/m$^2$ day @ 1 atmosphere, 0% RH, 23° C. Permeability of the 1.6 micron CARBOSET CR760 nanocomposite is 0.035 cc mM/m$^2$ day atmosphere @ 0% RH, 23° C.

Example 14

CARBOSET CR760 Acrylic with Glycine Treated MICROLITE Filler

An aqueous barrier coating solution according to this invention is prepared as follows, in which the matrix is CARBOSET CR760 acrylic polymer (Noveon, Inc., 40.7%) and the filler is MICROLITE® exfoliated silicate. The filler was treated in this example with 30.7% glycine by weight filler and stirring for 1 hour.

In an 8 oz jar, 26.25 grams of MICROLITE 963 was mixed with 3.14 grams of glycine (Lab Safety Supply, 20%) and 15.61 grams of distilled water. The resulting solution was stirred with a stir bar for 1 hour.

To the above solution, 7.44 grams of CARBOSET CR760, and 22.43 grams of distilled water was added. The resulting solution was stirred with a stir bar for 1 hour. The resulting dispersion at room temperature is ready for application, e.g., spray-coating, onto a plastic or rubber substrate. The coating mixture has 7.6% solids in water content.

After this coating solution is applied to a PET film substrate and allowed to dry, the coating contains 53.1% by weight CARBOSET CR760, 35.9% by weight filler, and 11.0% by weight glycine.

The oxygen transmission rate (OTR) is measured using a MOCON® OX-TRAN 2/20 module. The OTR is 41.3 cc/m$^2$ day @ 1 atmosphere, 0% RH, 23° C. Permeability of the 1.0 micron CARBOSET CR760 nanocomposite is 0.064 cc mm/m$^2$ day atmosphere @ 0% RH, 23° C.

Example 15

CARBOSET CR760 Acrylic with Glycine Treated MICROLITE Filler

An aqueous barrier coating solution according to this invention is prepared as follows, in which the matrix is CARBOSET CR760 acrylic polymer (Noveon, Inc., 40.7%) and the filler is MICROLITE® exfoliated silicate. The filler was treated in this example with 30.7% glycine by weight filler and stirring for 1 hour.

In an 8 oz jar, 38.5 grams of MICROLITE 963 was mixed with 4.61 grams of glycine (Lab Safety Supply, 20%) and 13.14 grams of distilled water. The resulting solution was stirred with a stir bar for 1 hour.

To the above solution, 10.91 grams of CARBOSET CR760, and 7.84 grams of distilled water was added. The resulting solution was stirred with a stir bar for 1 hour. The resulting dispersion at room temperature is ready for application, e.g., spray-coating, onto a plastic or rubber substrate. The coating mixture has 11.2% solids in water content.

After this coating solution is applied to a PET film substrate and allowed to dry, the coating contains 53.1% by weight CARBOSET CR760, 35.9% by weight filler, and 11.0% by weight glycine.

The oxygen transmission rate (OTR) is measured using a MOCON® OX-TRAN 2/20 module. The OTR is –16.9 cc/m$^2$ day @ 1 atmosphere, 0% RH, 23° C. Permeability of the 1.6 micron CARBOSET CR760 nanocomposite is 0.032 cc mm/m$^2$ day atmosphere @ 0% RH, 23° C.

Example 16

FLEXBOND 325 Acrylic with Glycine Treated MICROLITE Filler

An aqueous barrier coating solution according to this invention is prepared as follows, in which the matrix is FLEXBOND 325 acrylic polymer (Air Products and Chemicals, Inc, 55.1%) and the filler is MICROLITE® exfoliated silicate. The filler was treated in this example with 30.7% glycine by weight filler and stirring for 1 hour.

In an 8 oz jar, 38.5 grams of MICROLITE 963 was mixed with 4.61 grams of glycine (Lab Safety Supply, 20%) and 13.14 grams of distilled water. The resulting solution was stirred with a stir bar for 1 hour.

To the above solution, 8.06 grams of FLEXBOND 325, and 10.69 grams of distilled water was added. The resulting solution was stirred with a stir bar for 1 hour. The resulting dispersion at room temperature is ready for application, e.g., spray-coating, onto a plastic or rubber substrate. The coating mixture has 11.2% solids in water content.

After this coating solution is applied to a PET film substrate and allowed to dry, the coating contains 53.1% by weight FLEXBOND 325, 35.9% by weight filler, and 11.0% by weight glycine.

The oxygen transmission rate (OTR) is measured using a MOCON® OX-TRAN 2/20 module. The OTR is 9.26 cc/m$^2$ day @ 1 atmosphere, 0% RH, 23° C. Permeability of the 0.9 micron FLEXBOND 325 nanocomposite is 0.0091 cc mm/m$^2$ day atmosphere @ 0% RH, 23° C. The reduction in permeability of this coating is 3077 times the reduction in permeability of the unfilled FLEXBOND 325 latex. The oxygen transmission rate (OTR) is also measured using a MOCON® OX-TRAN 2/20 module at 30C and 70% RH. The OTR is 15.6 cc/m$^2$ day @ 1 atmosphere, 70% RH, 30° C. Permeability of the 0.9 micron FLEXBOND 325 nanocomposite is 0.016 cc mm/m$^2$ day atmosphere @ 70% RH, 30° C.

Example 17

FLEXBOND 381 Acrylic with Glycine Treated MICROLITE Filler

An aqueous barrier coating solution according to this invention is prepared as follows, in which the matrix is FLEXBOND 381 acrylic polymer (Air Products and Chemicals, Inc, 54.5%) and the filler is MICROLITE® exfoliated silicate. The filler was treated in this example with 30.7% glycine by weight filler and stirring for 1 hour.

In an 8 oz jar, 38.5 grams of MICROLITE 963 was mixed with 4.61 grams of glycine (Lab Safety Supply, 20%) and 13.14 grams of distilled water. The –20 resulting solution was stirred with a stir bar for 1 hour.

To the above solution, 8.06 grams of FLEXBOND 381, and 10.69 grams of distilled water was added. The resulting solution was stirred with a stir bar for 1 hour. The resulting dispersion at room temperature is ready for application, e.g., spray-coating, onto a plastic or rubber substrate. The coating mixture has 11.1% solids in water content.

After this coating solution is applied to a PET film substrate and allowed to dry, the coating contains 52.8% by weight FLEXBOND 381, 36.1% by weight filler, and 11.1% by weight glycine.

The oxygen transmission rate (OTR) is measured using a MOCON® OX-TRAN 2/20 module. The OTR is 7.91 cc/m$^2$ day @ 1 atmosphere, 0% RH, 23° C. Permeability of the 1.0 micron FLEXBOND 381 nanocomposite is 0.0085 cc mm/m$^2$ day atmosphere @ 0% RH, 23° C. The reduction in permeability of this coating is 4212 times the reduction in permeability of the unfilled FLEXBOND 381 latex. The oxygen transmission rate (OTR) is also measured using a MOCON® OX-TRAN 2/20 module at 30° C. and 70% RH. The OTR is 14.7 cc/m$^2$ day @ 1 atmosphere, 70% RH, 30° C. Permeability of the 0.9 micron FLEXBOND 381 nanocomposite is 0.015 cc mm/m$^2$ day atmosphere @ 70% RH, 30° C.

Example 18

Alberdingk AC 2514VP Acrylic with Glycine Treated MICROLITE Filler

An aqueous barrier coating solution according to this invention is prepared as follows, in which the matrix is Alberdiningk AC 2514VP acrylic polymer (Alberdiningk Boley, Inc 42.7%) and the filler is MICROLITE® exfoliated silicate. The filler was treated in this example with 30.7% glycine by weight filler and stirring for 1 hour.

In an 8 oz jar, 38.5 grams of MICROLITE 963 was mixed with 4.61 grams of glycine (Lab Safety Supply, 20%) and 13.14 grams of distilled water. The resulting solution was stirred with a stir bar for 1 hour.

To the above solution, 10.4 grams of Alberdiningk AC 2514VP, and 8.35 grams of distilled water was added. The resulting solution was stirred with a stir bar for 1 hour. The resulting dispersion at room temperature is ready for application, e.g., spray-coating, onto a plastic or rubber substrate. The coating mixture has 11.2% solids in water content.

After this coating solution is applied to a PET film substrate and allowed to dry, the coating contains 53.1% by weight Alberdiningk AC 2514VP, 35.9% by weight filler, and 11.0% by weight glycine.

The oxygen transmission rate (OTR) is measured using a MOCON® OX-TRAN 2/20 module. The OTR is 8.54 cc/m$^2$ day @ 1 atmosphere, 0% RH, 23° C. Permeability of the 1.3 micron Alberdiningk AC 2514VP nanocomposite is 0.012 cc mm/m$^2$ day atmosphere @ 0% RH, 23° C.

Example 19

INCOREZ W2400 Acrylic with Glycine Treated MICROLITE Filler

An aqueous barrier coating solution according to this invention is prepared as follows, in which the matrix is INCOREZ W2400 acrylic polymer (INCOREZ Corporation, 43.4%) and the filler is MICROLITE® exfoliated silicate. The filler was treated in this example with 30.7% glycine by weight filler and stirring for 1 hour.

In an 8 oz jar, 38.5 grams of MICROLITE 963 was mixed with 4.61 grams of glycine (Lab Safety Supply, 20%) and 13.14 grams of distilled water. The resulting solution was stirred with a stir bar for 1 hour.

To the above solution, 10.23 grams of INCOREZ W2400, and 8.52 grams of distilled water was added. The resulting solution was stirred with a stir bar for 1 hour. The resulting dispersion at room temperature is ready for application, e.g., spray-coating, onto a plastic or rubber substrate. The coating mixture has 11.1% solids in water content.

After this coating solution is applied to a PET film substrate and allowed to dry, the coating contains 53.0% by weight INCOREZ W2400, 35.9% by weight filler, and 11.0% by weight glycine.

The oxygen transmission rate (OTR) is measured using a MOCON® OX-TRAN 2/20 module. The OTR is 18.9 cc/m$^2$ day @ 1 atmosphere, 0% RH, 23° C. Permeability of the 1.1 micron INCOREZ W2400 nanocomposite is 0.025 cc mm/m$^2$ day atmosphere @ 0% RH, 23° C. The reduction in permeability of this coating is 1592 times the reduction in permeability of the unfilled INCOREZ W2400 latex.

Example 20

INCOREZ W2450 Acrylic with Glycine Treated MICROLITE Filler

An aqueous barrier coating solution according to this invention is prepared as follows, in which the matrix is INCOREZ W2450 acrylic polymer (INCOREZ Corporation, 42.9%) and the filler is MICROLITE® exfoliated silicate. The filler was treated in this example with 30.7% glycine by weight filler and stirring for 1 hour.

In an 8 oz jar, 38.5 grams of MICROLITE 963 was mixed with 4.61 grams of glycine (Lab Safety Supply, 20%) and 13.14 grams of distilled water. The resulting solution was stirred with a stir bar for 1 hour.

To the above solution, 10.35 grams of INCOREZ W2450, and 8.4 grams of distilled water was added. The resulting solution was stirred with a stir bar for 1 hour. The resulting dispersion at room temperature is ready for application, e.g., spray-coating, onto a plastic or rubber substrate. The coating mixture has 11.2% solids in water content.

After this coating solution is applied to a PET film substrate and allowed to dry, the coating contains 53.1% by weight INCOREZ W2450, 35.9% by weight filler, and 11.0% by weight glycine.

The oxygen transmission rate (OTR) is measured using a MOCON® OX-TRAN 2/20 module. The OTR is 21.9 cc/m$^2$ day @ 1 atmosphere, 0% RH, 23° C. Permeability of the 1.2 micron INCOREZ W2450 nanocomposite is 0.032 cc mm/m$^2$ day atmosphere @ 0% RH, 23° C. The reduction in permeability of this coating is 1753 times the reduction in permeability of the unfilled INCOREZ W2450 latex.

Example 21

DORESCO TAW4-39 Acrylic with Glycine Treated MICROLITE Filler

An aqueous barrier coating solution according to this invention is prepared as follows, in which the matrix is DORESCO TAW4-39 acrylic polymer (Lubrizol, Dock Resins, 31.0%) and the filler is MICROLITE® exfoliated silicate. The filler was treated in this example with 30.7% glycine by weight filler and stirring for 1 hour.

In an 8 oz jar, 38.5 grams of MICROLITE 963 was mixed with 4.61 grams of glycine (Lab Safety Supply, 20%) and 13.14 grams of distilled water. The resulting solution was stirred with a stir bar for 1 hour.

To the above solution, 14.32 grams of DORESCO TAW4-39, and 4.43 grams of distilled water was added. The resulting solution was stirred with a stir bar for 1 hour. The resulting dispersion at room temperature is ready for application, e.g., spray-coating, onto a plastic or rubber substrate. The coating mixture has 11.2% solids in water content.

After this coating solution is applied to a PET film substrate and allowed to dry, the coating contains 53.1% by weight DORESCO TAW4-39, 35.9% by weight filler, and 11.0% by weight glycine.

The oxygen transmission rate (OTR) is measured using a MOCON® OX-TRAN 2/20 module. The OTR is 1.92 cc/m$^2$ day @ 1 atmosphere, 0% RH, 23° C. Permeability of the 1.2 micron DORESCO TAW4-39 nanocomposite is 0.0023 cc mm/m$^2$ day atmosphere @ 0% RH, 23° C. The reduction in permeability of this coating is 3957 times the reduction in permeability of the unfilled DORESCO TAW4-39 latex. The oxygen transmission rate (OTR) is also measured using a MOCON® OX-TRAN 2/20 module at 30° C. and 70% RH. The OTR is 4.15 cc/m$^2$ day @ 1 atmosphere, 70% RH, 30° C. Permeability of the 1.25 micron DORESCO TAW4-39 nanocomposite is 0.0054 cc mm/m$^2$ day atmosphere @ 70% RH, 30° C.

Example 22

DORESCO TAW4-39 Acrylic with Glycine Treated MICROLITE Filler

An aqueous barrier coating solution according to this invention is prepared as follows, in which the matrix is DORESCO TAW4-39 acrylic polymer (Lubrizol, Dock Resins, 31.1%) and the filler is MICROLITE® exfoliated silicate. The filler was treated in this example with 30.7% glycine by weight filler and stirring for 1 hour.

In an 8 oz jar, 77.0 grams of MICROLITE 963 was mixed with 9.22 grams of glycine (Lab Safety Supply, 20%) and 26.28 grams of distilled water. The resulting solution was stirred with a stir bar for 1 hour.

To the above solution, 28.64 grams of DORESCO TAW4-39, and 8.86 grams of distilled water was added. The resulting solution was stirred with a stir bar for 1 hour. The resulting dispersion at room temperature is ready for application, e.g., spray-coating, onto a plastic or rubber substrate. The coating mixture has 11.2% solids in water content.

After this coating solution is applied to a PET film substrate and allowed to dry, the coating contains 53.2% by weight DORESCO TAW4-39, 35.8% by weight filler, and 11.0% by weight glycine.

The oxygen transmission rate (OTR) is measured using a MOCON® OX-TRAN 2/20 module. The OTR is 3.35 cc/m$^2$ day @ 1 atmosphere, 0% RH, 23° C. Permeability of the 1.3 micron DORESCO TAW4-39 nanocomposite is 0.0045 cc mm/m$^2$ day atmosphere @ 0% RH, 23° C. The reduction in permeability of this coating is 2022 times the reduction in permeability of the unfilled DORESCO TAW4-39 latex. The oxygen transmission rate (OTR) is also measured using a MOCON® OX-TRAN 2/20 module at 30° C. and 70% RH. The OTR is 4.52 cc/m$^2$ day @ 1 atmosphere, 70% RH, 30° C. Permeability of the 1.2 micron DORESCO TAW4-39 nanocomposite is 0.0056 cc mm/m$^2$ day atmosphere @ 70% RH, 30° C.

Example 23

DORESCO TAW4-39 Acrylic with Glycine Treated MICROLITE Filler

An aqueous barrier coating solution according to this invention is prepared as follows, in which the matrix is DORESCO TAW4-39 acrylic polymer (Lubrizol, Dock Resins, 31.1%) and the filler is MICROLITE® exfoliated silicate. The filler was treated in this example with 30.7% glycine by weight filler and stirring for 1 hour.

In an 8 oz jar, 38.5 grams of MICROLITE 963 was mixed with 4.61 grams of glycine (Lab Safety Supply, 20%). The resulting solution was stirred with a stir bar for 1 hour.

To the above solution, 14.28 grams of DORESCO TAW4-39, 17.61 grams of distilled water and 0.15 grams of ERANOL-345 (Enviro Resins and Additives, 100%) was added. The resulting solution was stirred with a stir bar for 1 hour. The resulting dispersion at room temperature is ready for application, e.g., spray-coating, onto a plastic or rubber substrate. The coating mixture has 11.3% solids in water content.

After this coating solution is applied to a PET film substrate and allowed to dry, the coating contains 52.1% by weight DORESCO TAW4-39, 35.3% by weight filler, 1.8% ERANOL-345 wetting agent and 10.8% by weight glycine.

The oxygen transmission rate (OTR) is measured using a MOCON® OX-TRAN 2/20 module. The OTR is 4.03 cc/m$^2$ day @ 1 atmosphere, 0% RH, 23° C. Permeability of the 1.4 micron DORESCO TAW4-39 nanocomposite is 0.0058 cc mm/m$^2$ day atmosphere @ 0% RH, 23° C. The reduction in permeability of this coating is 1569 times the reduction in permeability of the unfilled DORESCO TAW4-39 latex. The oxygen transmission rate (OTR) is also measured using a MOCON® OX-TRAN 2/20 module at 30° C. and 70% RH. The OTR is 7.96 cc/m$^2$ day @ 1 atmosphere, 70% RH, 30° C. Permeability of the 1.2 micron DORESCO TAW4-39 nanocomposite is 0.010 cc mm/m2 day atmosphere @ 70% RH, 30° C.

Example 24

DORESCO TAW4-39 Acrylic with Glycine Treated MICROLITE Filler

An aqueous barrier coating solution according to this invention is prepared as follows, in which the matrix is DORESCO TAW4-39 acrylic polymer (Lubrizol, Dock Resins, 31.1%) and the filler is MICROLITE® exfoliated silicate. The filler was treated in this example with 30.7% glycine by weight filler and stirring for 1 hour.

In an 8 oz jar, 38.5 grams of MICROLITE 963 was mixed with 4.61 grams of glycine (Lab Safety Supply, 20%). The resulting solution was stirred with a stir bar for 1 hour.

To the above solution, 14.28 grams of DORESCO TAW4-39, 17.61 grams of distilled water and 0.05 grams of SURFYNOL PSA336 (Air Products and Chemicals, Inc, 100%) was added. The resulting solution was stirred with a stir bar for 1 hour. The resulting dispersion at room temperature is ready for application, e.g., spray-coating, onto a plastic or rubber substrate. The coating mixture has 11.2% solids in water content.

After this coating solution is applied to a PET film substrate and allowed to dry, the coating contains 52.8% by weight DORESCO TAW4-39, 35.7% by weight filler, 0.6% SURFYNOL PSA336 wetting agent and 11.0% by weight glycine.

The oxygen transmission rate (OTR) is measured using a MOCON® OX-TRAN 2/20 module. The OTR is 4.47 cc/m$^2$ day @ 1 atmosphere, 0% RH, 23° C. Permeability of the 1.1 micron DORESCO TAW4-39 nanocomposite is 0.0051 cc mm/m$^2$ day atmosphere @ 0% RH, 23° C. The reduction in permeability of this coating is 1750 times the reduction in permeability of the unfilled DORESCO TAW4-39 latex. The oxygen transmission rate (OTR) is also measured using a MOCON® OX-TRAN 2/20 module at 30° C. and 70% RH.

The OTR is 6.0 cc/m² day @ 1 atmosphere, 70% RH, 30° C. Permeability of the 1.2 micron DORESCO TAW4-39 nanocomposite is 0.0076 cc mm/m² day atmosphere @ 70% RH, 30° C.

Example 25

DORESCO TAW4-39 Acrylic with Acetic Acid Treated Montmorrillonite Filler

An aqueous barrier coating solution according to this invention is prepared as follows, in which the matrix is DORESCO TAW4-39 acrylic polymer (Lubrizol, Dock Resins, 31.1%) and the filler is Montmorrillonite SCPX 2041 (Southern Clay Products, Inc, 2.1%) exfoliated silicate. The filler was treated in this example with 125.0% acetic acid by weight filler.

In an 8 oz jar, 62.5 grams of Montmorrillonite SCPX 2041 was mixed with 1.64 grams of acetic acid (Brenntag Northeast, Inc.). The resulting solution was stirred with a stir bar.

To the above solution, 6.49 grams of DORESCO TAW4-39, and 4.37 grams of distilled water was added. The resulting solution was stirred with a stir bar. The resulting dispersion at room temperature is ready for application, e.g., spray-coating, onto a plastic or rubber substrate. The coating mixture has 6.6% solids in water content.

After this coating solution is applied to a PET film substrate and allowed to dry, the coating contains 40.6% by weight DORESCO TAW4-39, 26.4% by weight filler, and 33.0% by weight acetic acid.

The oxygen transmission rate (OTR) is measured using a MOCON® OX-TRAN 2/20 module. The OTR is 17.6 cc/m² day @ 1 atmosphere, 0% RH, 23° C. Permeability of the 0.25 micron DORESCO TAW4-39 nanocomposite is 0.0052 cc mm/m² day atmosphere @ 0% RH, 23° C. The reduction in permeability of this coating is 1750 times the reduction in permeability of the unfilled DORESCO TAW4-39 latex. The oxygen transmission rate (OTR) is also measured using a MOCON® OX-TRAN 2/20 module at 30° C. and 70% RH. The OTR is 21.9 cc/m² day® 1 atmosphere, 70% RH, 30° C. Permeability of the 0.3 micron DORESCO TAW4-39 nanocomposite is 0.0081 cc mm/m² day atmosphere @ 70% RH, 30° C.

Example 26

DORESCO TAW4-39 Acrylic with Acetic Acid Treated Montmorrillonite Filler

An aqueous barrier coating solution according to this invention is prepared as follows, in which the matrix is DORESCO TAW4-39 acrylic polymer (Lubrizol, Dock Resins, 31.1%) and the filler is Montmorrillonite SCPX 2041 (Southern Clay Products, Inc, 2.1%) exfoliated silicate. The filler was treated in this example with 62.5% acetic acid by weight filler.

In an 8 oz jar, 62.5 grams of Montmorrillonite SCPX 2041 was mixed with 0.82 grams of acetic acid (Brenntag Northeast, Inc.). The resulting solution was stirred with a stir bar.

To the above solution, 6.49 grams of DORESCO TAW4-39, and 5.19 grams of distilled water was added. The resulting solution was stirred with a stir bar. The resulting dispersion at room temperature is ready for application, e.g., spray-coating, onto a plastic or rubber substrate. The coating mixture has 5.5% solids in water content.

After this coating solution is applied to a PET film substrate and allowed to dry, the coating contains 48.6% by weight DORESCO TAW4-39, 31.6% by weight filler, and 19.8% by weight acetic acid.

The oxygen transmission rate (OTR) is measured using a MOCON® OX-TRAN 2/20 module. The OTR is 19.6 cc/m² day @ 1 atmosphere, 0% RH, 23° C. Permeability of the 0.3 micron DORESCO TAW4-39 nanocomposite is 0.0071 cc mm/m² day atmosphere @ 0% RH, 23° C. The reduction in permeability of this coating is 1282 times the reduction in permeability of the unfilled DORESCO TAW4-39 latex. The oxygen transmission rate (OTR) is also measured using a MOCON® OX-TRAN 2/20 module at 30° C. and 70% RH. The OTR is 47.7 cc/m² day @ 1 atmosphere, 70% RH, 30° C. Permeability of the 0.2 micron DORESCO TAW4-39 nanocomposite is 0.016 cc mm/m² day atmosphere @ 70% RH, 30° C.

Example 27

DORESCO TAW4-39 Acrylic with Glycine Treated Montmorrillonite Filler

An aqueous barrier coating solution according to this invention is prepared as follows, in which the matrix is DORESCO TAW4-39 acrylic polymer (Lubrizol, Dock Resins, 31.1%) and the filler is Montmorrillonite SCPX 2041 (Southern Clay Products, Inc, 2.1%) exfoliated silicate. The filler was treated in this example with 31.8% glycine by weight filler and stirring for 1 hour.

In an 8 oz jar, 62.5 grams of Montmorrillonite SCPX 2041 was mixed with 2.09 grams of glycine (Lab Safety Supply, 20%). The resulting solution was stirred with a stir bar for 1 hour.

To the above solution, 6.49 grams of DORESCO TAW4-39, and 3.92 grams of distilled water was added. The resulting solution was stirred with a stir bar for 1 hour. The resulting dispersion at room temperature is ready for application, e.g., spray-coating, onto a plastic or rubber substrate. The coating mixture has 5.0% solids in water content.

After this coating solution is applied to a PET film substrate and allowed to dry, the coating contains 53.8% by weight DORESCO TAW4-39, 35.0% by weight filler, and 11.1% by weight glycine.

The oxygen transmission rate (OTR) is measured using a MOCON® OX-TRAN 2/20 module. The OTR is 4.92 cc/m² day @ 1 atmosphere, 0% RH, 23° C. Permeability of the 0.5 micron DORESCO TAW4-39 nanocomposite is 0.0026 cc mm/m² day atmosphere @ 0% RH, 23° C. The reduction in permeability of this coating is 3500 times the reduction in permeability of the unfilled DORESCO TAW4-39 latex. The oxygen transmission rate (OTR) is also measured using a MOCON® OX-TRAN 2/20 module at 30° C. and 70% RH. The OTR is 5.3 cc/m² day @ 1 atmosphere, 70% RH, 30° C. Permeability of the 0.6 micron DORESCO TAW4-39 nanocomposite is 0.0033 cc mM/m² day atmosphere @ 70% RH, 30° C.

Example 28

DORESCO TAW4-39 Acrylic with Glycine Treated Montmorrillonite Filler

An aqueous barrier coating solution according to this invention is prepared as follows, in which the matrix is DORESCO TAW4-39 acrylic polymer (Lubrizol, Dock Resins, 31.1%) and the filler is Montmorrillonite SCPX 2041

(Southern Clay Products, Inc, 2.1%) exfoliated silicate. The filler was treated in this example with 42.5% glycine by weight filler.

In an 8 oz jar, 62.5 grams of Montmorrillonite SCPX 2041 was mixed with 2.79 grams of glycine (Lab Safety Supply, 20%). The resulting solution was stirred with a stir bar.

To the above solution, 6.04 grams of DORESCO TAW4-39, and 3.67 grams of distilled water was added. The resulting solution was stirred with a stir bar. The resulting dispersion at room temperature is ready for application, e.g., spray-coating, onto a plastic or rubber substrate. The coating mixture has 5.0% solids in water content.

After this coating solution is applied to a PET film substrate and allowed to dry, the coating contains 50.1% by weight DORESCO TAW4-39, 35.0% by weight filler, and 14.9% by weight glycine.

The oxygen transmission rate (OTR) is measured using a MOCON® OX-TRAN 2/20 module. The OTR is 1.9 cc/m$^2$ day @ 1 atmosphere, 0% RH, 23° C. Permeability of the 0.7 micron DORESCO TAW4-39 nanocomposite is 0.0013 cc mm/m$^2$ day atmosphere @ 0% RH, 23° C. The reduction in permeability of this coating is 7000 times the reduction in permeability of the unfilled DORESCO TAW4-39 latex. The oxygen transmission rate (OTR) is also measured using a MOCON® OX-TRAN 2/20 module at 30° C. and 70% RH. The OTR is 3.89 cc/m$^2$ day @ 1 atmosphere, 70% RH, 30° C. Permeability of the 0.6 micron DORESCO TAW4-39 nanocomposite is 0.0024 cc mm/m$^2$ day atmosphere @ 70% RH, 30° C.

Example 29

DORESCO TAW4-39 Acrylic with Glycine Treated Montmorrillonite Filler

An aqueous barrier coating solution according to this invention is prepared as follows, in which the matrix is DORESCO TAW4-39 acrylic polymer (Lubrizol, Dock Resins, 31.1%) and the filler is Montmorrillonite SCPX 2041 (Southern Clay Products, Inc, 2.1%) exfoliated silicate. The filler was treated in this example with 53.2% glycine by weight filler.

In an 8 oz jar, 62.5 grams of Montmorrillonite SCPX 2041 was mixed with 3.49 grams of glycine (Lab Safety Supply, 20%). The resulting solution was stirred with a stir bar.

To the above solution, 5.59 grams of DORESCO TAW4-39, and 3.42 grams of distilled water was added. The resulting solution was stirred with a stir bar. The resulting dispersion at room temperature is ready for application, e.g., spray-coating, onto a plastic or rubber substrate. The coating mixture has 5.0% solids in water content.

After this coating solution is applied to a PET film substrate and allowed to dry, the coating contains 46.4% by weight DORESCO TAW4-39, 35.0% by weight filler, and 18.6% by weight glycine.

The oxygen transmission rate (OTR) is measured using a MOCON® OX-TRAN 2/20 module. The OTR is 0.59 cc/m$^2$ day @ 1 atmosphere, 0% RH, 23° C. Permeability of the 0.9 micron DORESCO TAW4-39 nanocomposite is 0.00053 cc mm/m$^2$ day atmosphere @ 0% RH, 23° C. The reduction in permeability of this coating is 17170 times the reduction in permeability of the unfilled-DORESCO-TAW4-39 latex. The oxygen transmission rate (OTR) is also measured using a MOCON® OX-TRAN 2/20 module at 30° C. and 70% RH. The OTR is 1.97 cc/m$^2$ day @ 1 atmosphere, 70% RH, 30° C. Permeability of the 0.7 micron DORESCO TAW4-39 nanocomposite is 0.0014 cc mm/m$^2$ day atmosphere @ 70% RH, 30° C.

Example 30

DORESCO TAW4-39 Acrylic with Glycine Treated Montmorrillonite Filler

An aqueous barrier coating solution according to this invention is prepared as follows, in which the matrix is DORESCO TAW4-39 acrylic polymer (Lubrizol, Dock Resins, 31.1%) and the filler is Montmorrillonite SCPX 2041 (Southern Clay Products, Inc, 2.1%) exfoliated silicate. The filler was treated in this example with 53.1% glycine by weight filler.

In an 8 oz jar, 50.0 grams of Montmorrillonite SCPX 2041 was mixed with 2.79 grams of glycine (Lab Safety Supply, 20%). The resulting solution was stirred with a stir bar.

To the above solution, 4.47 grams of DORESCO TAW4-39, and 17.74 grams of distilled water was added. The resulting solution was stirred with a stir bar. The resulting dispersion at room temperature is ready for application, e.g., spray-coating, onto a plastic or rubber substrate. The coating mixture has 4.0% solids in water content.

After this coating solution is applied to a PET film substrate and allowed to dry, the coating contains 46.4% by weight DORESCO TAW4-39, 35.0% by weight filler, and 18.6% by weight glycine.

The oxygen transmission rate (OTR) is measured using a MOCON® OX-TRAN 2/20 module. The OTR is 1.31 cc/m$^2$ day @ 1 atmosphere, 0% RH, 23° C. Permeability of the 0.65 micron DORESCO TAW4-39 nanocomposite is 0.00086 cc mm/m$^2$ day atmosphere @ 0% RH, 23° C. The reduction in permeability of this coating is 10581 times the reduction in permeability of the unfilled DORESCO TAW4-39 latex. The oxygen transmission rate (OTR) is also measured using a MOCON®) OX-TRAN 2/20 module at 30° C. and 70% RH. The OTR is 4.45 cc/m$^2$ day @ 1 atmosphere, 70% RH, 30° C. Permeability of the 0.5 micron DORESCO TAW4-39 nanocomposite is 0.0023 cc mm/m$^2$ day atmosphere @ 70% RH, 30° C.

Example 31

DORESCO TAW4-39 Acrylic with Glycine Treated Montmorrillonite Filler

An aqueous barrier coating solution according to this invention is prepared as follows, in which the matrix is DORESCO TAW4-39 acrylic polymer (Lubrizol, Dock Resins, 31.1%) and the filler is Montmorrillonite SCPX 2041 (Southern Clay Products, Inc, 2.1%) exfoliated silicate. The filler was treated in this example with 53.2% glycine by weight filler.

In an 8 oz jar, 56.25 grams of Montmorrillonite SCPX 2041 was mixed with 3.14 grams of glycine (Lab Safety Supply, 20%). The resulting solution was stirred with a stir bar.

To the above solution, 5.03 grams of DORESCO TAW4-39, and 10.58 grams of distilled water was added. The resulting solution was stirred with a stir bar. The resulting dispersion at room temperature is ready for application, e.g., spray-coating, onto a plastic or rubber substrate. The coating mixture has 4.5% solids in water content.

After this coating solution is applied to a PET film substrate and allowed to dry, the coating contains 46.4% by weight DORESCO TAW4-39, 35.0% by weight filler, and 18.6% by weight glycine.

The oxygen transmission rate (OTR) is measured using a MOCON® OX-TRAN 2/20 module. The OTR 0.91 is cc/m² day @ 1 atmosphere, 0% RH, 23° C. Permeability of the 0.65 micron DORESCO TAW4-39 nanocomposite is 0.00060 cc mm/m² day atmosphere @ 0% RH, 23° C. The reduction in permeability of this coating is 15167 times the reduction in permeability of the unfilled DORESCO TAW4-39 latex. The oxygen transmission rate (OTR) is also measured using a MOCON® OX-TRAN 2/20 module at 30° C. and 70% RH. The OTR is 3.53 cc/m² day @ 1 atmosphere, 70% RH, 30° C. Permeability of the 1.2 micron DORESCO TAW4-39 nanocomposite is 0.0044 cc mm/m² day atmosphere @ 70% RH, 30° C.

Example 32

DORESCO TAW4-39 Acrylic with Glycine Treated Montmorrillonite Filler

An aqueous barrier coating solution according to this invention is prepared as follows, in which the matrix is DORESCO TAW4-39 acrylic polymer (Lubrizol, Dock Resins, 31.1%) and the filler is Montmorrillonite SCPX 2041 (Southern Clay Products, Inc, 2.1%) exfoliated silicate. The filler was treated in this example with 53.2% glycine by weight filler.

In an 8 oz jar, 62.5 grams of Montmorrillonite SCPX 2041 was mixed with 3.49 grams of glycine (Lab Safety Supply, 20%). The resulting solution was stirred with a stir bar.

To the above solution, 5.59 grams of DORESCO TAW4-39, and 3.42 grams of distilled water and 0.15 grams of ERANOL-345 (Enviro Resins and Additives, 100%) was added. The resulting solution was stirred with a stir bar. The resulting dispersion at room temperature is ready for application, e.g., spray-coating, onto a plastic or rubber substrate. The coating mixture has 5.2% solids in water content.

After this coating solution is applied to a PET film substrate and allowed to dry, the coating contains 44.6% by weight DORESCO TAW4-39, 33.7% by weight filler, 3.8% ERANOL-345 wetting agent and 17.9% by weight-glycine.

The oxygen transmission rate (OTR) is measured using a MOCON® OX-TRAN 2/20 module. The OTR is 1.24 cc/m² day @ 1 atmosphere, 0% RH, 23° C. Permeability of the 0.8 micron DORESCO TAW4-39 nanocomposite is 0.0010 cc mm/m² day atmosphere @ 0% RH, 23° C. The reduction in permeability of this coating is 9100 times the reduction in permeability of the unfilled DORESCO TAW4-39 latex. The oxygen transmission rate (OTR) is also measured using a MOCON® OX-TRAN 2/20 module at 30° C. and 70% RH. The OTR is 3.61 cc/m² day @ 1 atmosphere, 70% RH, 30° C. Permeability of the 0.85 micron DORESCO TAW4-39 nanocomposite is 0.0032 cc mm/m² day atmosphere @ 70% RH, 30° C.

Example 33

DORESCO TAW4-39 Acrylic with Glycine Treated Montmorrillonite Filler

An aqueous barrier coating solution according to this invention is prepared as follows, in which the matrix is DORESCO TAW4-39 acrylic polymer (Lubrizol, Dock Resins, 31.1%) and the filler is Montmorrillonite SCPX 2041 (Southern Clay Products, Inc, 2.1%) exfoliated silicate. The filler was treated in this example with 53.2% glycine by weight filler.

In an 8 oz jar, 62.5 grams of Montmorrillonite SCPX 2041 was mixed with 3.49 grams of glycine (Lab Safety Supply, 20%). The resulting solution was stirred with a stir bar.

To the above solution, 5.59 grams of DORESCO TAW4-39, 3.42 grams of distilled water and 0.05 grams of SUR-FYNOL PSA336 (Air Products and Chemicals Inc., 100%) was added. The resulting solution was stirred with a stir bar. The resulting dispersion at room temperature is ready for application, e.g., spray-coating, onto a plastic or rubber substrate. The coating mixture has 5.1% solids in water content.

After this coating solution is applied to a PET film substrate and allowed to dry, the coating contains 45.8% by weight DORESCO TAW4-39, 34.5% by weight filler, 1.3% SUR-FYNOL PSA336 wetting agent and 18.4% by weight glycine.

The oxygen transmission rate (OTR) is measured using a MOCON® OX-TRAN 2/20 module. The OTR is 0.53 cc/m² day @ 1 atmosphere, 0% RH, 23° C. Permeability of the 0.65 micron DORESCO TAW4-39 nanocomposite is 0.00035 cc mm/m² day atmosphere @ 0% RH, 23° C. The reduction in permeability of this coating is 26000 times the reduction in permeability of the unfilled DORESCO TAW4-39 latex. The oxygen transmission rate (OTR) is also measured using a MOCON® OX-TRAN 2/20 module at 30° C. and 70% RH. The OTR is 2.36 cc/m² day @ 1 atmosphere, 70% RH, 30° C. Permeability of the 1.2 micron DORESCO TAW4-39 nanocomposite is 0.0029 cc mm/m² day atmosphere @ 70% RH, 30° C.

Example 34

DORESCO TAW7-1 Acrylic with Glycine Treated Montmorrillonite Filler

An aqueous barrier coating solution according to this invention is prepared as follows, in which the matrix is DORESCO TAW7-1 acrylic polymer (Lubrizol, Dock Resins, 50.0%) and the filler is Montmorrillonite SCPX 2041 (Southern Clay Products, Inc, 2.1%) exfoliated silicate. The filler was treated in this example with 53.2% glycine by weight filler.

In an 8 oz jar, 62.5 grams of Montmorrillonite SCPX 2041 was mixed with 3.49 grams of glycine (Lab Safety Supply, 20%). The resulting solution was stirred with a stir bar.

To the above solution, 3.47 grams of DORESCO TAW7-1, 5.54 grams of distilled water was added. The resulting solution was stirred with a stir bar. The resulting dispersion at room temperature is ready for application, e.g., spray-coating, onto a plastic or rubber substrate. The coating mixture has 5.0% solids in water content.

After this coating solution is applied to a PET film substrate and allowed to dry, the coating contains 46.3% by weight DORESCO TAW7-1, 35.0% by weight filler, and 18.6% by weight glycine.

The oxygen transmission rate (OTR) is measured using a MOCON® OX-TRAN 2/20 module. The OTR is 0.020 cc/m² day @ 1 atmosphere, 0% RH, 23° C. Permeability of the 0.8 micron DORESCO TAW7-1 nanocomposite is 0.000016 cc mm/m² day atmosphere @ 0% RH, 23° C. The reduction in permeability of this coating is 1937500 times the reduction in permeability of the unfilled DORESCO TAW7-1 latex. The oxygen transmission rate (OTR) is also measured using a MOCON® OX-TRAN 2/20 module at 30° C. and 70% RH. The OTR is 0.12 cc/m² day® 1 atmosphere, 70% RH, 30° C. Permeability of the 1.0 micron DORESCO TAW7-1 nanocomposite is 0.00012 cc mm/m² day atmosphere @ 70% RH, 30° C.

Control Example A

Unfilled JONCRYL 3030

The acrylic dispersion, JONCRYL 3030 (Johnson Polymer, LLC.) was applied onto polypropylene substrate as a control film for comparison to filled acrylic nanocomposites.

After this acrylic dispersion is applied to a polypropylene film substrate and allowed to dry, the coating contains 100% by weight JONCRYL 3030.

The oxygen transmission rate (OTR) is measured using a MOCON® OX-TRAN 2/20 module. The OTR is 2405 cc/m$^2$ day @ 1 atmosphere, 0% RH, 23° C. Permeability of the 6.0 micron JONCRYL 3030 acrylic is 40.2 cc mm/m$^2$ day atmosphere @ 0% RH, 23° C.

Control Example B

Unfilled JONCRYL 3040

The acrylic dispersion, JONCRYL 3040 (Johnson Polymer, LLC.) was applied onto polypropylene substrate as a control film for comparison to filled acrylic nanocomposites.

After this acrylic dispersion is applied to a polypropylene film substrate and allowed to dry, the coating contains 100% by weight JONCRYL 3040.

The oxygen transmission rate (OTR) is measured using a MOCON® OX-TRAN 2/20 module. The OTR is 2108 cc/m$^2$ day @ 1 atmosphere, 0% RH, 23° C. Permeability of the 6.0 micron JONCRYL 3040 acrylic is 28.9 cc mm/m$^2$ day atmosphere @ 0% RH, 23° C.

Control Example C

Unfilled HYCAR 26288

The acrylic dispersion, HYCAR 26288 (Noveon, Inc.) was applied onto polypropylene substrate as a control film for comparison to filled acrylic nanocomposites.

After this acrylic dispersion is applied to a polypropylene film substrate and allowed to dry, the coating contains 100% by weight HYCAR 26288.

The oxygen transmission rate (OTR) is measured using a MOCON® OX-TRAN 2/20 module. The OTR is 2381 cc/m$^2$ day @ 1 atmosphere, 0% RH, 23° C. Permeability of the 6.0 micron HYCAR 26288 acrylic is 39.1 cc mm/m$^2$ day atmosphere @ 0% RH, 23° C.

Control Example D

Unfilled CARBOSET 514H

The acrylic dispersion, CARBOSET 514H (Noveon, Inc.) was applied onto polypropylene substrate as a control film for comparison to filled acrylic nanocomposites.

After this acrylic dispersion is applied to a polypropylene film substrate and allowed to dry, the coating contains 100% by weight CARBOSET 514H.

The oxygen transmission rate (OTR) is measured using a MOCON® OX-TRAN 2/20 module. The OTR is 2026 cc/m$^2$ day @ 1 atmosphere, 0% RH, 23° C. Permeability of the 6.0 micron CARBOSET 514H acrylic is 26.4 cc mm/m$^2$ day atmosphere @ 0% RH, 23° C.

Control Example E

Unfilled FLEXBOND 325

The acrylic dispersion, FLEXBOND 325 (Air Products and Chemicals, Inc.) was applied onto polypropylene substrate as a control film for comparison to filled acrylic nanocomposites.

After this acrylic dispersion is applied to a polypropylene film substrate and allowed to dry, the coating contains 100% by weight FLEXBOND 325.

The oxygen transmission rate (OTR) is measured using a MOCON® OX-TRAN 2/20 module. The OTR is 2079 cc/m$^2$ day @ 1 atmosphere, 0% RH, 23° C. Permeability of the 6.0 micron FLEXBOND 325 acrylic is 28.0 cc mm/m$^2$ day atmosphere @ 0% RH, 23° C.

Control Example F

Unfilled FLEXBOND 381

The acrylic dispersion, FLEXBOND 381 (Air Products and Chemicals, Inc.) was applied onto polypropylene substrate as a control film for comparison to filled acrylic nanocomposites.

After this acrylic dispersion is applied to a polypropylene film substrate and allowed to dry, the coating contains 100% by weight FLEXBOND 381.

The oxygen transmission rate (OTR) is measured using a MOCON® OX-TRAN 2/20 module. The OTR is 2163 cc/m$^2$ day @ 1 atmosphere, 0% RH, 23° C. Permeability of the 7.0 micron FLEXBOND 381 acrylic is 35.8 cc mm/m$^2$ day atmosphere @ 0% RH, 23° C.

Control Example G

Unfilled INCOREZ W2400

The acrylic dispersion, INCOREZ 2400 (INCOREZ Corporation) was applied onto polypropylene substrate as a control film for comparison to filled acrylic nanocomposites.

After this acrylic dispersion is applied to a polypropylene film substrate and allowed to dry, the coating contains 100% by weight INCOREZ 2400.

The oxygen transmission rate (OTR) is measured using a MOCON® OX-TRAN 2/20 module. The OTR is 2259 cc/m$^2$ day @ 1 atmosphere, 0% RH, 23° C. Permeability of the 7.0 micron INCOREZ 2400 acrylic is 39.8 cc mm/m$^2$ day atmosphere @ 0% RH, 23° C.

Control Example H

Unfilled INCOREZ W2450

The acrylic dispersion, INCOREZ 2450 (INCOREZ Corporation) was applied onto polypropylene substrate as a control film for comparison to filled acrylic nanocomposites.

After this acrylic dispersion is applied to a polypropylene film substrate and allowed to dry, the coating contains 100% by weight INCOREZ 2450.

The oxygen transmission rate (OTR) is measured using a MOCON® OX-TRAN 2/20 module. The OTR is 2555 cc/m$^2$ day @ 1 atmosphere, 0% RH, 23° C. Permeability of the 7.0 micron INCOREZ 2450 acrylic is 56.1 cc mm/m² day atmosphere @ 0% RH, 23° C.

Control Example I

Unfilled DORESCO TAW4-39

The acrylic dispersion, DORESCO TAW4-39 (Lubrizol Dock Resins) was applied onto polypropylene substrate as a control film for comparison to filled acrylic nanocomposites.

After this acrylic dispersion is applied to a polypropylene film substrate and allowed to dry, the coating contains 100% by weight DORESCO TAW4-39.

The oxygen transmission rate (OTR) is measured using a MOCON® OX-TRAN 2/20 module. The OTR is 1150 cc/m² day @ 1 atmosphere, 0% RH, 23° C. Permeability of the 5.5 micron DORESCO TAW4-39 acrylic is 9.1 cc mm/m² day atmosphere @ 0% RH, 23° C.

Control Example J

Doresco TAW4-39 Acrylic with Untreated Montmorrillonite Filler

An aqueous barrier coating solution according to this invention is prepared as follows, in which the matrix is Doresco TAW4-39 acrylic polymer (Lubrizol, Dock Resins, 31.1%) and the filler is Montmorrillonite SCPX 2041 (Southern Clay Products, Inc, 2.1%) exfoliated silicate. The filler was untreated in this example.

In an 8 oz jar, 62.5 grams of Montmorrillonite SCPX 2041 was placed. The solution was stirred with a stir bar.

To the above solution, 7.84 grams of Doresco TAW4-39 and 4.66 grams of distilled water was added. The resulting solution was stirred with a stir bar for 1 hour. The resulting dispersion at room temperature is ready for application, e.g., spray-coating, onto a plastic or rubber substrate. The coating mixture has 5.0% solids in water content.

After this coating solution is applied to a PET film substrate and allowed to dry, the coating contains 65.0% by weight Doresco TAW4-39 and 35.0% by weight filler.

The oxygen transmission rate (OTR) is measured using a MOCON® OX-TRAN 2/20 module. The OTR is 17.8 cc/m² day @ 1 atmosphere, 0% RH, 23° C. Permeability of the 0.4 micron Doresco TAW4-39 nanocomposite is 0.0084 cc mm/m² day atmosphere @ 0% RH, 23° C. The reduction in permeability of this coating is 1083 times the reduction in permeability of the unfilled Doresco TAW4-39 latex.

Control Example K

Unfilled DORESCO TAW7-1

The acrylic dispersion, DORESCO TAW7-1 (Lubrizol Dock Resins) was applied onto polypropylene substrate as a control film for comparison to filled acrylic nanocomposites.

After this acrylic dispersion is applied to a polypropylene film substrate and allowed to dry, the coating contains 100% by weight DORESCO TAW7-1.

The oxygen transmission rate (OTR) is measured using a MOCON® OX-TRAN 2/20 module. The OTR is 2410 cc/m² day @ 1 atmosphere, 0% RH, 23° C. Permeability of the 4.6 micron DORESCO TAW7-1 acrylic is 31.0 cc mm/m² day atmosphere @ 0% RH, 23° C.

A summary of the data obtained in Examples 1-34 is listed in Table 1.

As can be seen from the data in Table 1, large reductions in permeability are again achieved, utilizing vermiculite or montmorillonite fillers pre-treated with glycine or acetic acid. These reductions in permeability can be realized for filler treatments ranging from as little as 17% by weight up to greater than 60% by weight of acid for periods ranging from 5 minutes to 3 days. In some of the cases shown, particularly those measured at 0% RH and 23° C., the reduction in OTR approaches the lower limits of sensitivity of the measuring apparatus (See Examples 16, 17 and 21-34). This is particularly true in the cases where the treated filler is montmorillonite (See Examples 25-34). Additionally, for most of these cases, a treatment time of only 5 minutes is sufficient to achieve these large reductions in permeability.

TABLE 1

ACRYLIC NANOCOMPOSITES

| Ex | Polymer | Treatment Agent | Filler | Treatment[1] | Permeability[2] 0% RH, 23C | Permeability[2] 70% RH, 30C | Reduction in Permeability[3] 0% RH, 23C | Increase in Permeability[4] % |
|---|---|---|---|---|---|---|---|---|
| Comp A | NEOREZ R-600 | Glycine | Vermiculite | 30.7%, 1 hr | 0.24 | 0.24 | | 0 |
| 1 | JONCRYL 3030 | Glycine | Vermiculite | 30.7%, 1 hr | 0.17 | 0.27 | 236 | 59 |
| B | JONCRYL 3030 | — | — | — | 40.2 | | | |
| 2 | JONCRYL 3040 | — | — | — | 28.9 | | | |
| 3 | JONCRYL 3040 | Glycine | Vermiculite | 30.7%, 1 hr | 0.063 | | 459 | |
| 4 | JONCRYL 3050 | Glycine | Vermiculite | 30.7%, 1 hr | 0.17 | 0.11 | | −35 |
|   | JONCRYL 3040 + 3050 | Glycine | Vermiculite | 30.7%, 1 hr | 0.090 | | | |
| C | HYCAR 26288 | — | — | — | 39.1 | | | |
| 5 | HYCAR 26288 | Acetic acid | Vermiculite | 17.7%, 3 days | 0.32 | | 122 | |
| 6 | HYCAR 26288 | Glycine | Vermiculite | 30.7%, 1 hr | 0.076 | | 514 | |
| 7 | HYCAR 26288 | Glycine | Vermiculite | 30.7%, 1 hr | 0.028 | 0.068 | 1396 | 143 |
| 8 | HYCAR 26288 | Glycine | Vermiculite | 30.7%, 1 hr | 0.031 | 0.073 | 1261 | 135 |
| 9 | HYCAR 26288 | Glycine | Vermiculite | 30.5%, 3 hr | 0.035 | 0.056 | 1117 | 60 |
| D | CARBOSET 514H | — | — | — | 26.4 | | | |
| 10 | CARBOSET 514H | Glycine | Vermiculite | 30.7%, 1 hr | 0.022 | | 1200 | |
| 11 | CARBOSET 514H | Glycine | Vermiculite | 30.7%, 1 hr | 0.017 | | 1553 | |
| 12 | CARBOSET 514H | Glycine | Vermiculite | 30.7%, 1 hr | 0.014 | | 1886 | |
| 13 | CARBOSET CR760 | Glycine | Vermiculite | 30.7%, 1 hr | 0.035 | | | |

TABLE 1-continued

ACRYLIC NANOCOMPOSITES

| | | Treatment | | | Permeability[2] | | Reduction in Permeability[3] | Increase in Permeability[4] |
|---|---|---|---|---|---|---|---|---|
| Ex | Polymer | Agent | Filler | Treatment[1] | 0% RH, 23C | 70% RH, 30C | 0% RH, 23C | % |
| 14 | CARBOSET CR760 | Glycine | Vermiculite | 30.7%, 1 hr | 0.064 | | | |
| 15 | CARBOSET CR760 | Glycine | Vermiculite | 30.7%, 1 hr | 0.032 | | | |
| E | FLEXBOND 325 | — | — | — | 28 | | | |
| 16 | FLEXBOND 325 | Glycine | Vermiculite | 30.7%, 1 hr | 0.0091 | 0.016 | 3077 | 76 |
| F | FLEXBOND 381 | — | — | — | 35.8 | | | |
| 17 | FLEXBOND 381 | Glycine | Vermiculite | 30.7%, 1 hr | 0.0085 | 0.015 | 4212 | 76 |
| 18 | Alberdingk AC2514VP | Glycine | Vermiculite | 30.7%, 1 hr | 0.012 | | | |
| G | INCOREZ W2400 | — | — | — | 39.8 | | | |
| 19 | INCOREZ W2400 | Glycine | Vermiculite | 30.7%, 1 hr | 0.025 | | 1592 | |
| H | INCOREZ W2450 | — | — | — | 56.1 | | | |
| 20 | INCOREZ W2450 | Glycine | Vermiculite | 30.7%, 1 hr | 0.033 | | 1753 | |
| I | DORESCO TAW4-39 | — | — | — | 9.1 | | | |
| 21 | DORESCO TAW4-39 | Glycine | Vermiculite | 30.7%, 1 hr | 0.0023 | 0.0054 | 3957 | 135 |
| 22 | DORESCO TAW4-39 | Glycine | Vermiculite | 30.7%, 5 min | 0.0045 | 0.0056 | 2022 | 24 |
| 23 | DORESCO TAW4-39 | Glycine | Vermiculite | 30.7%, 1 hr | 0.0058 | 0.010 | 1569 | 72 |
| 24 | DORESCO TAW4-39 | Glycine | Vermiculite | 30.7%, 1 hr | 0.0051 | 0.0076 | 1784 | 49 |
| J | DORESCO TAW4-39 | — | Montmorillonite | — | 0.0084 | | 1083 | |
| 25 | DORESCO TAW4-39 | Acetic acid | Montmorillonite | 125%, 5 min | 0.0052 | 0.0081 | 1750 | 56 |
| 26 | DORESCO TAW4-39 | Acetic acid | Montmorillonite | 62.5%, 5 min | 0.0071 | 0.016 | 1282 | 125 |
| 27 | DORESCO TAW4-39 | Glycine | Montmorillonite | 31.8%, 1 hr | 0.0026 | 0.0033 | 3500 | 27 |
| 28 | DORESCO TAW4-39 | Glycine | Montmorillonite | 42.5%, 5 min | 0.0013 | 0.0024 | 7000 | 85 |
| 29 | DORESCO TAW4-39 | Glycine | Montmorillonite | 53.2%, 5 min | 0.00053 | 0.0014 | 17170 | 164 |
| 30 | DORESCO TAW4-39 | Glycine | Montmorillonite | 53.1%, 5 min | 0.00086 | 0.0023 | 10581 | 188 |
| 31 | DORESCO TAW4-39 | Glycine | Montmorillonite | 53.2%, 5 min | 0.0006 | 0.0044 | 15167 | 633 |
| 32 | DORESCO TAW4-39 | Glycine | Montmorillonite | 53.2%, 5 min | 0.001 | 0.0032 | 9100 | 220 |
| 33 | DORESCO TAW4-39 | Glycine | Montmorillonite | 53.2%, 5 min | 0.00035 | 0.0029 | 26000 | 729 |
| K | DORESCO TAW7-1 | — | — | — | 31 | | | |
| 34 | DORESCO TAW7-1 | Glycine | Montmorillonite | 53.2%, 5 min | 0.000016 | 0.00012 | 1937500 | 650 |

Notes:
[1]% acid by weight filler.
[2]Oxygen permeability in units cc mm/m[2] day atmosphere at specified temperature and relative humidity.
[3]Times permeability reduced from unfilled resin.
[4]Percent permeability increased due to increase in relative humidity and temperature.

While the invention has been described in connection with several embodiments, modifications of those embodiments within the spirit and scope of the present invention will be readily apparent to those of skill in the art. The invention is defined in the appended claims. In view of the foregoing discussion, relevant knowledge in the art and references discussed above in connection with the Background and Detailed Description, the disclosures of which are all incorporated herein by reference, further description is deemed unnecessary.

What is claimed is:

1. An article of manufacture comprising an acrylic nanocomposite film adhered to a substrate, wherein said acrylic nanocomposite film comprises;
    (a) a non-elastomeric acrylic polymer;
    (b) an acid-treated, layered silicate filler material which has an aspect ratio of at least about 25, has not been organically functionalized and is substantially exfoliated; and
    (c) optionally, one or more additives selected from the group consisting of surfactants, emulsifiers, anti-foaming agents, dispersing agents, wetting agents, leveling agents, thickeners, absorbers and getters,
    wherein said film comprises the dried residue of an aqueous nanocomposite dispersion of the non-elastomeric acrylic polymer and the layered silicate filler, the aqueous nanocomposite dispersion being a combination of an aqueous dispersion of the acrylic polymer with an aqueous dispersion of the layered silicate filler which has been treated with an acid prior to combination with the aqueous polymer dispersion;
    wherein further said acrylic nanocomposite film exhibits an oxygen permeability that is at least 50 times less than a like film containing no layered silicate filler material.

2. The article of manufacture according to claim 1 wherein said acrylic nanocomposite film exhibits an oxygen permeability that is at least 100 times less than a like film containing no layered silicate filler material.

3. The article of manufacture according to claim 1 wherein said acrylic nanocomposite film exhibits an oxygen permeability that is at least 500 times less than a like film containing no layered silicate filler material.

4. The article of manufacture according to claim 1 wherein said acrylic nanocomposite film exhibits an oxygen permeability that is at least 1,000 less lower than a like film containing no layered silicate filler material.

5. The article of manufacture according to claim 1 wherein said acrylic nanocomposite film exhibits an oxygen permeability that is at least 5,000 times less than a like film containing no layered silicate filler material.

6. The article of manufacture according to claim 1 wherein said acrylic nanocomposite film exhibits an oxygen permeability that is at least 10,000 times less than a like film containing no layered silicate filler material.

7. The article of manufacture according to claim 1 wherein said acrylic nanocomposite film has an oxygen permeability of less than about 0.1 cc-mm/m$^2$-day-atm at 23° C. and 0% relative humidity.

8. The article of manufacture according to claim 1 wherein said acrylic nanocomposite film has an oxygen permeability of less than about 0.01 cc-mm/m$^2$-day-atm at 23° C. and 0% relative humidity.

9. The article of manufacture according to claim 1 wherein said acrylic nanocomposite film has an oxygen permeability of less than about 0.001 cc-mm/m$^2$-day-atm at 23° C. and 0% relative humidity.

10. The article of manufacture according to claim 1 wherein said acrylic nanocomposite comprises between about 65% and about 95% acrylic polymer.

11. The article of manufacture according to claim 1 wherein said acrylic polymer is chosen from the group consisting of polymers of acrylates, methacrylates, acrylonitrile, acrylamides, methacrylamides, copolymers thereof and optionally containing vinyls, styrenes and ole fins.

12. The article of manufacture according to claim 1 wherein said acrylic polymer is self-crosslinking.

13. The article of manufacture according to claim 1 wherein said acrylic polymer contains hydroxyl groups.

14. The article of manufacture according to claim 13 wherein the concentration of said hydroxyl groups corresponds to a hydroxyl number ranging from 1 to 50.

15. The article of manufacture according to claim 14 wherein the concentration of said hydroxyl groups corresponds to a hydroxyl number ranging from 10 to 40.

16. The article of manufacture according to claim 15 wherein the concentration of said hydroxyl groups corresponds to a hydroxyl number ranging from 15 to 30.

17. The article of manufacture of claim 1 wherein said acrylic nanocomposite film comprises between about 5 wt. percent and about 60 wt. percent silicate filler material.

18. The article of manufacture of claim 1 wherein said acrylic nanocomposite film comprises between about 35 wt. percent and about 40 wt. percent silicate filler material.

19. The article of manufacture according to claim 1 wherein said silicate filler comprises platelets having an average aspect ratio of at least about 25.

20. The article of manufacture according to claim 19 wherein said silicate filler comprises platelets having an average aspect ratio of at least about 100.

21. The article of manufacture according to claim 20 wherein said silicate filler comprises platelets having an average aspect ratio of at least about 500.

22. The article of manufacture according to claim 21 wherein said silicate filler comprises platelets having an average aspect ratio of at least about 5,000.

23. The article of manufacture according to claim 1 wherein said silicate filler characteristically exhibits oriented, macroscopic domains when dispersed in water at a concentration of 0.02% by weight.

24. The article of manufacture according to claim 1 wherein said silicate is selected from the group consisting of bentonite, vermiculite, montmorillonite, nontronite, beidellite, volkonskoite, hectorite, saponite, laponite, sauconite, magadiite, kenyaite, ledikite and combinations thereof.

25. The article of manufacture according to claim 24 wherein said silicate is vermiculite.

26. The article of manufacture according to claim 24 wherein said silicate is montmorillonite.

27. The article of manufacture according to claim 1 wherein said acrylic nanocomposite film further comprises between about 5 wt. % and about 40 wt. % acid.

28. The article of manufacture of claim 1 wherein said acid is either acetic acid or glycine.

29. The article of manufacture, according to claim 1 wherein the acrylic nanocomposite film has a thickness of between about 0.1 μm to about 200 μm.

30. The article of manufacture, according to claim 1 wherein the acrylic nanocomposite film has a thickness of between about 0.1 μm to about 100 μ.

31. The article of manufacture, according to claim 1 wherein the acrylic nanocomposite film has a thickness of between about 0.1 μm to about 50 μm.

32. The article of manufacture, according to claim 1 wherein the acrylic nanocomposite film has a thickness of between about 0.1 μm to about 10 μm.

33. The article of manufacture, according to claim 1 wherein said substrate is a film or a molded article comprising a plastic selected from the group consisting of polyesters, polyamides, chlorinated polymers, polyolefins, polyurethanes, polyethers, polyketones, polycarbonates, vinylics (such as vinyl acetate and vinyl chloride), styrenes, fluoropolymers, and combinations thereof.

34. The article of manufacture, according to claim 33 wherein said plastic comprises polyethylene terephthalate (PET).

35. The article of manufacture, according to claim 1 wherein said substrate is selected from the group consisting of antiseptic packaging films, corrosion protective films, vacuum and controlled atmosphere packages, blow molded containers, thermoformed containers and electronic display films.

36. A barrier coating mixture comprising an aqueous nanocomposite dispersion of:
(a) water;
(b) a non-elastomeric acrylic polymer;
(c) a substantially exfoliated silicate filler material that has been acid treated, is not organically functionalized and has an aspect ratio of at least about 25; and
(d) optionally, one or more additives selected from the group consisting of surfactants, emulsifiers, anti-foaming agents, dispersing agents, wetting agents, leveling agents, thickeners, absorbers and getters,
wherein the nanocomposite dispersion is a combination of an aqueous dispersion of the acrylic polymer with an aqueous dispersion of the substantially exfoliated silicate filler material which has been treated with an acid prior to combination with the aqueous polymer dispersion.

37. The acrylic barrier coating mixture according to claim 36 wherein said dispersion is in a form selected from the group consisting of an emulsion, a suspension and a latex.

38. The acrylic barrier coating mixture according to claim 36 wherein said dispersion has a total solids content of from about 5 to about 30%.

39. The acrylic barrier coating mixture according to claim 36 wherein said silicate is present in said dispersion at between about 10% to about 60% of the total solids content of the dispersion.

40. A film made from the dried coating mixture of claim 36.

41. A method of making a barrier coating mixture comprising the steps of:
a) providing a first dispersion containing substantially polymerized non-elastomeric acrylic resin;
b) providing a second dispersion containing substantially exfoliated silicate filler which has an aspect ratio of at least 25 and has not been organically functionalized, with the proviso that the second dispersion is substantially free of reactive acrylic monomer;

c) treating the second dispersion with an acid; and
d) admixing the first dispersion and the acid-treated second dispersion.

42. The method according to claim 41 wherein said acid comprises glycine.

43. The method according to claim 41 wherein said first dispersion contains a welling agent.

44. A method of producing a nanocomposite acrylic barrier coating film comprising:
  a) providing a first dispersion containing substantially polymerized non-elastomeric acrylic resin;
  b) providing a second dispersion containing substantially exfoliated silicate filler which has an aspect ratio of at least 25 and has not been organically functionalized, with the proviso that the second dispersion is substantially free of reactive acrylic monomer;
  c) treating the second dispersion with an acid;
  d) admixing the first dispersion and the acid-treated second dispersion; and
  e) drying the dispersion to form a film having a like polymer to filler ratio as in said dispersion,
wherein the film has an oxygen permeability that is at least 50 times less than a like film containing no layered silicate filler material.

* * * * *